(12) United States Patent
Sheerin et al.

(10) Patent No.: US 8,507,579 B2
(45) Date of Patent: Aug. 13, 2013

(54) AQUEOUS COATING COMPOSITIONS WITH DE MINIMIS VOLATILE EMISSIONS

(75) Inventors: Robert J. Sheerin, North Caldwell, NJ (US); Jean F. Mauck, Hackettstown, NJ (US); Hrire Gharapetian, Ridgewood, NJ (US); Gordon Kotora, Oakland, NJ (US)

(73) Assignee: Columbia Insurance Company, Omaha, NE (US)

( * ) Notice: Subject to any disclaimer, the term of this patent is extended or adjusted under 35 U.S.C. 154(b) by 212 days.

(21) Appl. No.: 12/746,716

(22) PCT Filed: Jun. 12, 2009

(86) PCT No.: PCT/US2009/047248
§ 371 (c)(1), (2), (4) Date: Jun. 7, 2010

(87) PCT Pub. No.: WO2010/008713
PCT Pub. Date: Jan. 21, 2010

(65) Prior Publication Data
US 2011/0098376 A1    Apr. 28, 2011

Related U.S. Application Data

(60) Provisional application No. 61/061,431, filed on Jun. 13, 2008, provisional application No. 61/061,418, filed on Jun. 13, 2008.

(51) Int. Cl.
*C08K 3/32* (2006.01)
*C08K 5/10* (2006.01)
*C08K 5/45* (2006.01)
*C08L 31/00* (2006.01)

(52) U.S. Cl.
USPC ............. 523/122; 524/84; 524/317; 524/417; 524/556

(58) Field of Classification Search
USPC .................. 523/122; 524/317, 417, 556, 84
See application file for complete search history.

(56) References Cited

U.S. PATENT DOCUMENTS

| | | |
|---|---|---|
| 3,003,930 A | 10/1961 | Pugh et al. |
| 3,423,346 A | 1/1969 | Klauss |
| 4,130,527 A | 12/1978 | Miller et al. |
| 4,137,208 A | 1/1979 | Elliott |
| 4,900,592 A | 2/1990 | Hahn, Jr. et al. |
| 5,055,197 A | 10/1991 | Albright et al. |
| 5,516,818 A | 5/1996 | Chen et al. |
| 5,776,842 A | 7/1998 | Wood et al. |
| 5,859,074 A | 1/1999 | Rezai et al. |
| 6,069,200 A | 5/2000 | Chen et al. |
| 6,348,636 B1 | 2/2002 | Racz |
| 6,353,087 B1 | 3/2002 | Chang-Mateu et al. |
| 6,359,110 B1 | 3/2002 | Mussell et al. |
| 6,638,998 B2 | 10/2003 | Zhao et al. |
| 6,740,691 B1 | 5/2004 | Lorteije et al. |
| 6,762,230 B2 | 7/2004 | Brandenburger et al. |
| 6,881,782 B2 | 4/2005 | Crater et al. |
| 7,309,684 B2 * | 12/2007 | Filippini et al. ............ 510/201 |
| 2004/0161542 A1 | 8/2004 | Ziemann et al. |
| 2005/0192388 A1 | 9/2005 | Craun et al. |
| 2006/0258555 A1 * | 11/2006 | Filippini et al. ............ 510/417 |
| 2006/0270815 A1 | 11/2006 | Ittel et al. |
| 2007/0116879 A1 | 5/2007 | Negri et al. |
| 2007/0142596 A1 | 6/2007 | Swift et al. |
| 2007/0237738 A1 | 10/2007 | Hanzlicek et al. |
| 2010/0041801 A1 * | 2/2010 | Dowling et al. ............ 524/186 |

OTHER PUBLICATIONS

International Search Report and Written Opinion of the International Searching Authority issued in connection with corresponding International Application No. PCT/US2009/047248 on Dec. 28, 2009.
Hay, J.N. and A. Khan. "Review: Environmentally Friendly Coatings Using Carbon Dioxide as the Carrier Medium." pp. 4743-4752. May 13, 2002. Kluwer Academic Publishers. United Kingdom.

* cited by examiner

*Primary Examiner* — Kriellion Sanders
(74) *Attorney, Agent, or Firm* — The H.T. Than Law Group

(57) ABSTRACT

The present invention relates to an aqueous coating composition comprising a treated latex polymer dispersion with less than about 50 ppm of unreacted monomers. The latex polymer dispersion can be treated by various means, including stripping and chasing, to remove unreacted monomers from the dispersion. Unreacted monomers significantly contribute to paint odor. In an innovative aspect of the present invention, the synergistic combination of the treated latex dispersion with pigments and other low or zero-VOC additives results in an aqueous coating composition with de minimis levels of volatile emissions, low odor, and paint performance comparable to premium latex paints.

29 Claims, 5 Drawing Sheets

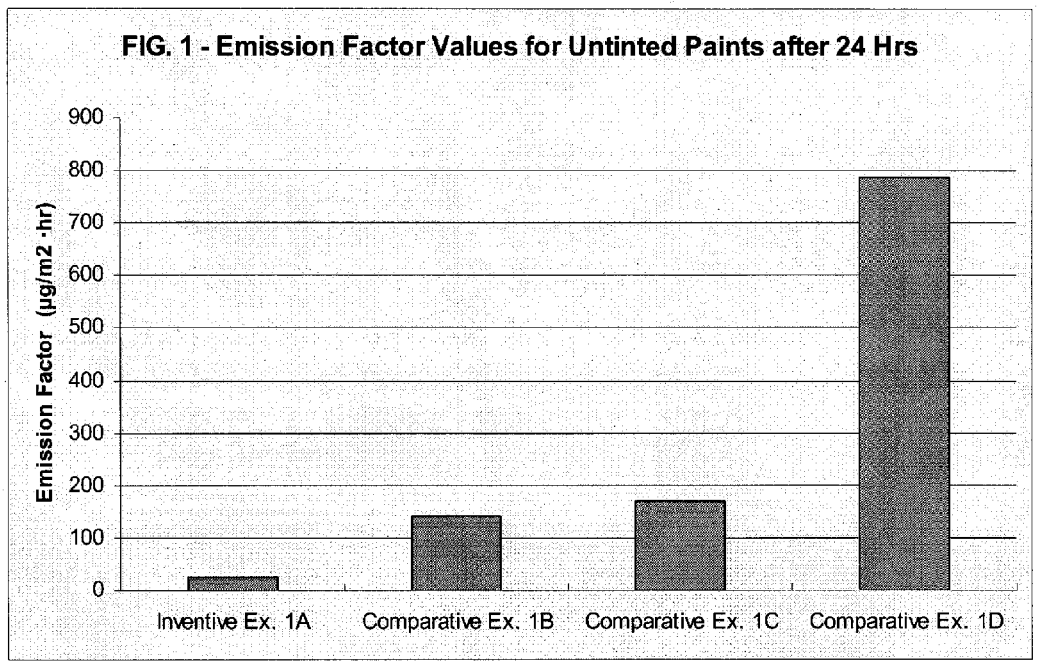

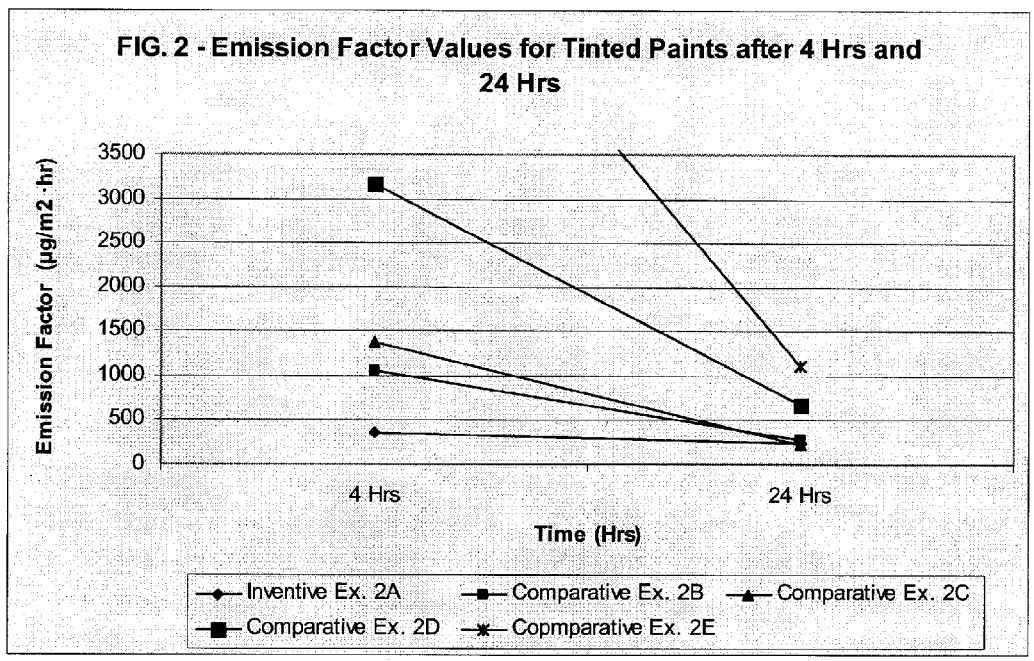

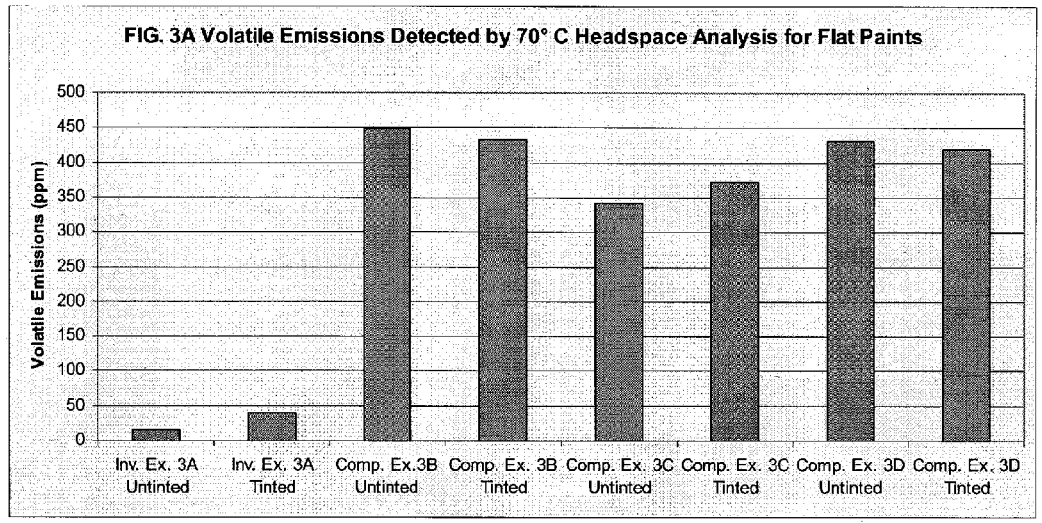
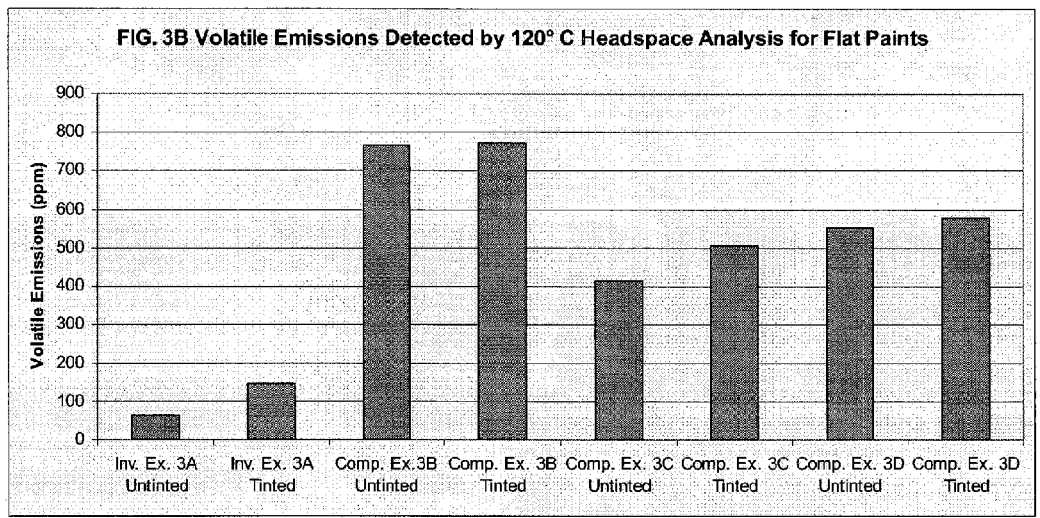

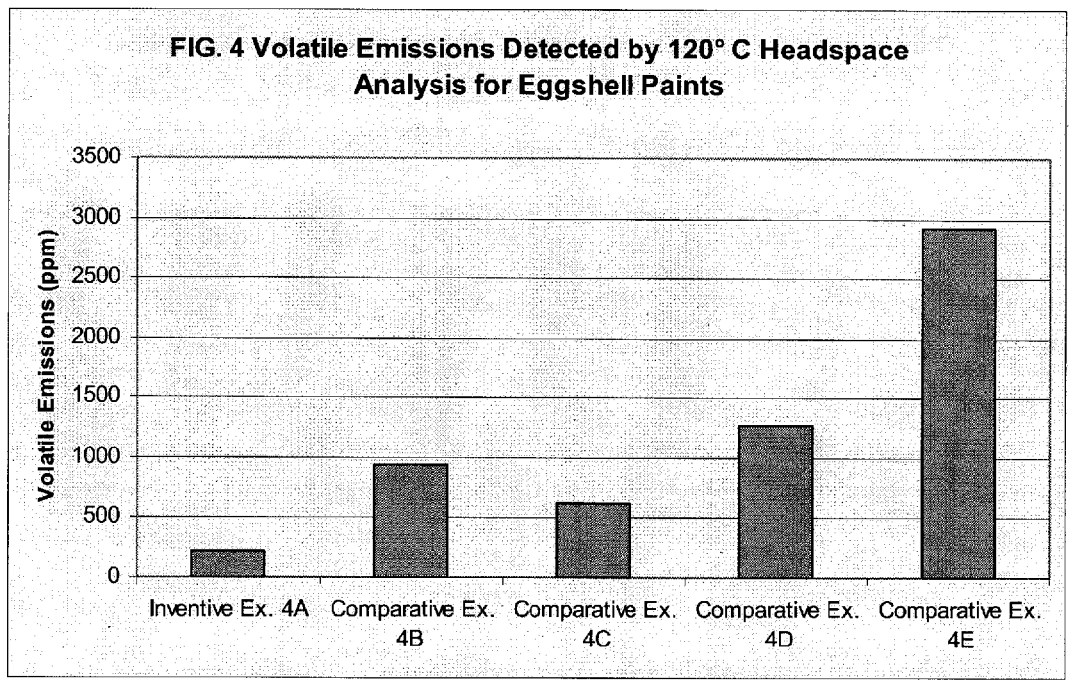

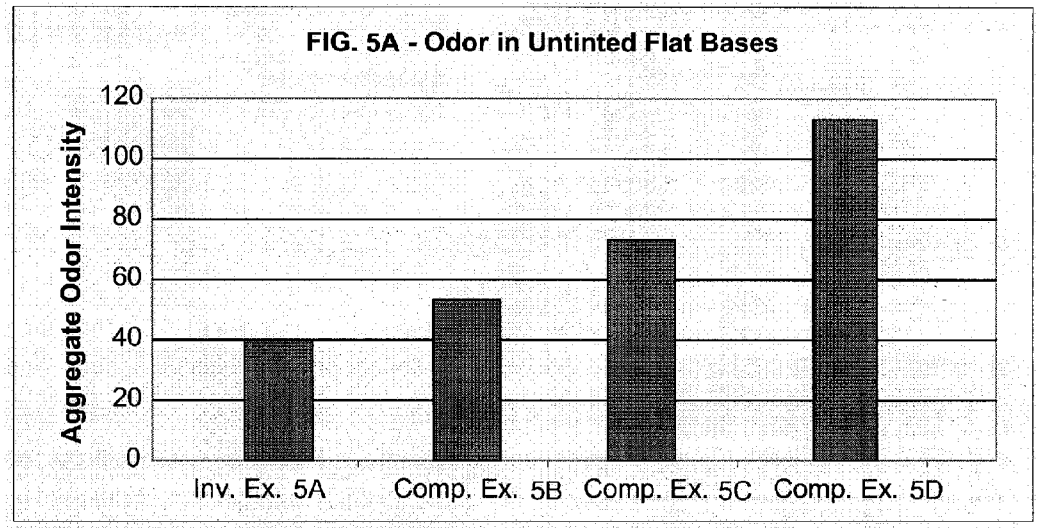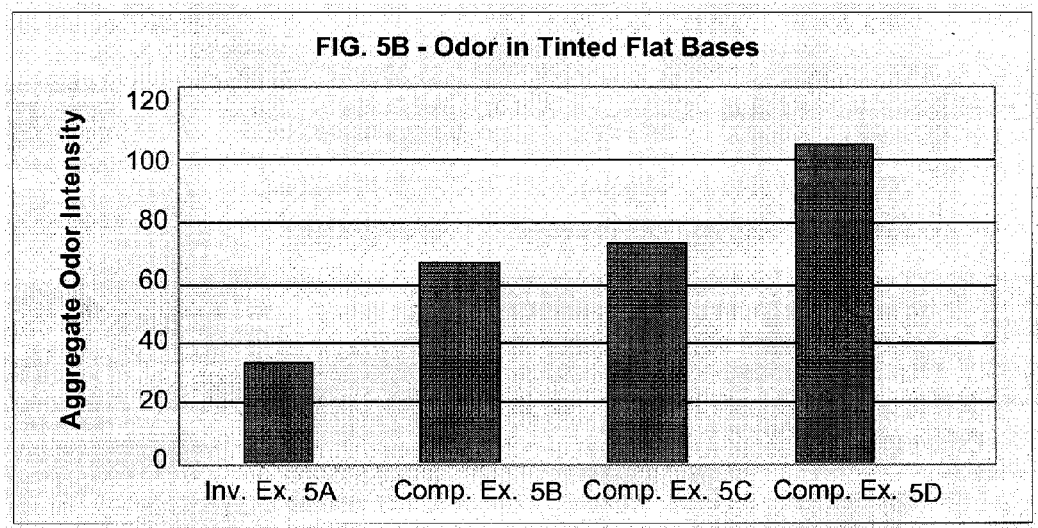

AQUEOUS COATING COMPOSITIONS WITH DE MINIMIS VOLATILE EMISSIONS

CROSS-REFERENCE TO RELATED APPLICATIONS

The present application is the US national phase of PCT/US2009/047248 which claims priority of the following earlier applications, U.S. Provisional Application Ser. Nos. 61/061,418 and 61/061,431, both filed on Jun. 13, 2008, the disclosures of which are incorporated by reference herein in their entireties.

FIELD OF THE INVENTION

The present invention relates to an aqueous coating composition and a method for making same. More particularly, the present invention relates to an aqueous coating composition that exhibits de minimis volatile emissions.

BACKGROUND OF THE INVENTION

Due to environmental and health concerns, among other things, there has been a movement toward reducing the amount of volatile organic compounds (VOCs) in paints, stains, and other coating compositions. However, many coatings that are marketed as "low-VOC" or even "zero-VOC" still emit high quantities of volatile emissions such as ammonia which is inorganic and not accounted for in the VOC total. Furthermore, the performance of the paint system may decrease due to the absence of VOCs in coatings, and paint manufacturers have been searching for ways to develop better performing coating compositions with low volatile emissions. The quest for a better "green paint" is discussed in a New York Times newspaper article entitled "The Promise of Green Paint" (Kershaw, Sarah, The New York Times, May 15, 2008, p. F6), which is incorporated herein by reference in its entirety.

Typically, additives that facilitate or impart desirable paint properties, such as better film coalescence from a latex, better resistance to blocking, better film durability, better physical and chemical scrub resistance, and tougher coatings, among others, contain volatile compounds, which evaporate into the environment upon film formation. The evaporation often results in undesirable aromas, and exposure to such fumes, particularly in areas that are not well ventilated, remains a health concern. Thus, less volatile or non-volatile compounds that impart comparable (or superior) properties to the paints are needed to replace higher VOC additives.

For instance, U.S. Pat. No. 6,762,230 B2 discloses paint compositions containing a latex polymer and dispersible coalescents having a VOC content less than about 50% wt. The '230 patent describes the dispersible coalescents as preferably having low molecular weight, though the examples indicate their structure as being formed by a reaction between ε-caprolactone and an alcohol or a carboxylic acid.

U.S. Pat. No. 6,069,200 discloses aqueous curable compositions comprising polymers with sterically hindered alkoxylated silane groups and acid groups blocked by fugitive bases. The '200 patent teaches that these groups can be crosslinked using organometallic catalysts. The compositions of the '200 patent are disclosed to be used as adhesives, sealants, and paints, and are disclosed to have improved properties including solvent resistance, adhesion, hardness, abrasion resistance, and mar resistance. The '200 patent, however, teaches the use of conventional VOC compositions.

U.S. Patent Application Publication No. 2004/0161542 A1 discloses an aqueous composition and method for preparing a non-yellowing coating therefrom. The '542 publication discloses compositions having less than 5 wt % VOCs and discloses that the compositions are useful for preparing crosslinked coatings. Although the '542 publication discloses low-VOC content, it does not demonstrably achieve low volatile emissions, and thus would still lead to odors.

However, the VOC information used in the paint industry does not account for volatile inorganic compounds and the amount of volatile compounds that actually evaporate during the painting process or when paints dry. Thus, there remains a need for an aqueous coating composition, with de minimis volatile emissions, that performs at least as well as conventional VOC paints.

SUMMARY OF THE INVENTION

The present invention concerns an aqueous coating composition comprising a treated latex comprising polymer particles made from constituent monomers, wherein the treated latex is substantially free from residual components including unreacted monomers, volatile byproducts from the manufacturing of the monomers and latex, residual artifacts from the polymerizing process and the likes. Preferably, the residual components and preferably unreacted monomers are less than about 50 ppm, less than about 40 ppm, less than about 30 ppm, less than about 25 ppm, less than about 20 ppm or less than about 10 ppm. The treated latex is added to a pigment dispersion comprising one or more pigments selected from the group consisting of opacifying pigments, color pigments, and extender pigments. The aqueous coating composition optionally comprises one or more additives with de minimis volatile emissions selected from the group consisting of coalescence solvents, pH adjustors, surfactants, defoamers, dispersants, rheology modifiers, biocides, and preservatives. The synergistic combination of the treated latex, pigments, and additives produces an aqueous coating composition with de minimis volatile emissions and a Comparative Odor Intensity Index value of less than about 2.0. The aqueous coating composition may have de minimis volatile emissions if (i) the composition exhibits volatile emission values less than about 250 ppm, as measured according to headspace gas chromatography/mass spectrometry at about 70° C. or 120° C.; (ii) the composition comprises a color pigment and has a volatile emission factor of less than about 500 μg/m²·hr as measured according to ASTM D-5116 after a four hour period; or (iii) the composition does not comprise a color pigment and has a volatile emission factor of less than about 50 μg/m²·hr as measured according to ASTM D-5116 after a twenty-four hour period.

BRIEF DESCRIPTION OF THE DRAWINGS

In the accompanying drawings, which form a part of the specification and are to be read in conjunction therewith:

FIG. 1 is a bar graph plotting emission factor values, measured after 24 hours, for inventive and comparative untinted paints with a flat finish.

FIG. 2 is a graph plotting emission factor values, measured after 4 hours and 24 hours, for inventive and comparative tinted paints with an eggshell finish.

FIG. 3A is a bar graph plotting volatile emissions values detected by 70° C. headspace analysis for inventive and comparative paints with a flat finish. FIG. 3B is a bar graph plotting volatile emissions values detected by 120° C. headspace analysis for inventive and comparative paints with a flat finish.

FIG. 4 is a bar graph plotting volatile emissions values detected by 120° C. headspace analysis for inventive and comparative paints with an eggshell finish.

FIG. 5A is a bar graph plotting the aggregate Comparative Odor Intensity Index values for an inventive untinted paint and three comparative untinted paints with a flat finish. FIG. 5B is a graph plotting the aggregate Comparative Odor Intensity Index values for an inventive tinted paint and three comparative tinted paints with a flat finish.

DETAILED DESCRIPTION OF THE INVENTION

The present invention relates to an aqueous coating composition comprising a treated latex polymer dispersion that is substantially free from residual compounds, and that further comprises additives with low levels of volatile emissions. The latex polymer dispersion can be treated by various means, including stripping and chasing, to remove residual compounds, which can significantly contribute to paint odor. "Residual compounds" include, but are not limited to, unreacted monomers, volatile byproducts from the manufacturing of the monomers and latex, residual artifacts from the polymerizing process, such as tertiary butanol and the likes. Preferably, the unreacted monomers are less than about 50 ppm, more preferably less than about 40 ppm, more preferably less than about 30 ppm, more preferably less than about 25 ppm, more preferably less than about 20 ppm, more preferably less than about 15 ppm and even more preferably less than about 10 ppm or less than about 5 ppm. In an innovative aspect of the present invention, the synergistic combination of the treated latex with pigments and other additives results in an aqueous coating composition with de minimis volatile emissions, low odor, and paint performance comparable to premium latex paints.

The quest for a better paint should involve lowering all volatile emissions, because volatile organic compound (VOC) content in itself is an insufficient indicator of an aqueous coating composition's safety and environmental friendliness. Under Title 40, Section 51.100(s) of the Code of Federal Regulations, a VOC refers to compounds of carbon that participate in atmospheric photochemical reactions. However, this definition specifically excludes methane and other organic compounds that undergo negligible photochemical reactions. Furthermore, VOC content does not measure the content of volatile inorganic compounds (VIC) such as ammonia and ammonium salts in aqueous coating compositions. Further, VOC content does not measure all organic pollutants emitted by an aqueous coating composition, as explained in the following excerpt from a United States government publication:

> [T]he VOC contained in the bulk paint may not be the VOC emitted since VOCs can be formed as byproducts of chemical reactions after the paint is applied. ("Evaluation of Low-VOC Latex Paints," *Inside IAQ*, Fall/Winter 1998, p. 2).

It is important to account for other organic compounds formed in situ and VICs because their vapor emissions can also have a negative impact on health and the environment. Thus, as used herein, the term "volatile emissions" refers to the emissions of VOCs, other organic compounds, and/or VICs, whose vapors can be emitted from an aqueous coating composition.

As used herein, the term de minimis volatile emissions can have several definitions. Under a first definition, the term de minimis volatile emissions means volatile emission factor values, for an untinted aqueous coating composition, that are less than about 50 $\mu g/m^2 \cdot hr$, more preferably less than about 40 $\mu g/m^2 \cdot hr$, and most preferably less than about 30 $\mu g/m^2 \cdot hr$, as measured after a twenty-four (24) hour period by an environmental chamber test following ASTM D-5116. This test measures the rate of volatile emissions as a coating composition dries to form a film after 24 hours.

Under a second definition, the term de minimis volatile emissions means volatile emission factor values, for a tinted aqueous coating composition, that are less than about 500 $\mu g/m^2 \cdot hr$, preferably less than about 450 $\mu g/m^2 \cdot hr$, more preferably less than about 400 $\mu g/m^2 \cdot hr$, and most preferably less than about 375 $\mu g/m^2 \cdot hr$ as measured after a four (4) hour period by an environmental chamber test following ASTM D-5116, which, as mentioned above, measures the rate of volatile emissions as a coating composition dries to form a film after 4 hours. It is expected that the rate of emissions after 4 hours would be higher than the rate of emissions after 24 hours.

Under a third definition, the term de minimis volatile emissions means volatile emission values, for an aqueous coating composition comprising only a treated latex, that are less than about 250 ppm or less than about 200 ppm, more preferably less than about 150 ppm or less than about 100 ppm, even more preferably less than about 50 ppm or less than 25 ppm of discrete volatiles, as measured by a 70° C. or 120° C. headspace analysis test. This test, which is a cumulative test, detects volatile emissions from an aqueous solution that is in the bulk state at a specified temperature.

The first and second definitions, which follow ASTM D-5116, relate to a snapshot or a rate of emission of all volatile compounds. The head space test used in the third and fourth definitions is a cumulative test.

Aqueous compositions, or components thereof, that have de minimis volatile emissions also have low- or zero-VOC and low- or zero-VIC content. "Low-VOC" compositions and components can have a VOC content of not more than about 250 g/L (about 25% w/v), preferably not more than about 150 g/L (about 15% w/v), more preferably not more than about 100 g/L (about 10% w/v), most preferably not more than about 50 g/L (about 5% w/v), for example not more than about 30 g/L (about 3% w/v) or not more than about 20 g/L (about 2% w/v). "Zero-VOC" compositions can also be part of the low-VOC compositions of this invention. Zero-VOC compositions can advantageously have a VOC content of not more than about 10 g/L (about 1% w/v), preferably not more than about 8 g/L (about 0.8% w/v), more preferably not more than about 5 g/L (about 0.5% w/v), for example not more than about 2 g/L (about 0.2% w/v). It should be noted that the low-VOC and zero-VOC values above exclude water. The "% w/v" values stated above exclude water. Low- or zero-VIC content is similarly defined as the low-VOC and zero-VOC values above.

In the present invention, the following method, explained in greater detail below and illustrated in the Examples, is used to manufacture and utilize an aqueous coating composition for the purpose of reducing volatile emissions to a de minimis level. Initially, a latex polymer dispersion is formulated by polymerizing polymer particles in a latex from constituent monomers. The latex is then treated to remove residual compounds, discussed above and below. The treated latex is added to a pigment dispersion, which is formulated by admixing one or more pigments, including opacifying pigments, color pigments and extender pigments, with water, thickeners, dispersants and defoamers. In addition to these additives, one can add other additives to the pigment dispersion including coalescence solvents, pH adjustors, surfactants, rheology modifiers, biocides, and preservatives. Furthermore, if desired, more colorant(s), tinting compounds and/or pigment(s) can be added to the paint composition either to complement the (white) pigment(s)/colorant(s) already in the pigment dispersion composition or to tint the paint composition to another color. All of the pigments and other additives have de minimis volatile emissions. After the aqueous paint composition is formulated, it can be applied to a substrate, e.g., a wall, and let dry for a period of twenty-four (24) hours.

Typically, during a polymerization process, some of the constituent monomers do not react and remain in the dispersive phase as residual unreacted monomers. In addition to such unreacted monomers, the dispersive phase further comprises other compounds such as residual catalysts, chasers, artifacts, and byproducts including, but not limited to, acetone, 2-methyl-methyl-propanoate, n-butyl ether, butyl propanoate, and 1-butanol. As used herein, the term "residual compounds" encompasses all such unreacted monomers, residual catalysts, chasers, artifacts, byproducts, and the likes. These residual compounds are at least partially volatile and tend to have strong odors, and thus contribute to the volatile emissions of the paint composition. Such volatile emissions can be hazardous and people can detect the volatile emissions at very low levels, such as in the parts per million range. Accordingly, the polymer dispersions used in the present invention are preferably treated to remove residual compounds. Polymer latex dispersions can be treated to remove compounds by several means including stripping, chasing, adding a molecule such as activated carbon that absorbs organic residues, complexing the residual compounds with cyclodextrin, or running the latex through a purification step such as a column or ion exchange column. Commercial examples of latexes that can be treated include, but are not limited to, ACRONAL OPTIVE® 130 (BASF Architectural Coatings).

As used herein, the terms "substantially no" and "substantially free from," referring to residual and/or unreacted monomers, means that a treated latex comprises not more than about 50 ppm, preferably no more than about 40 ppm, more preferably no more than about 30 ppm, more preferably no more than about 25 ppm, more preferably no more than about 20 ppm, more preferably no more than about 15 ppm and even more preferably no more than about 10 ppm of unreacted monomers.

Stripping is one of several methods that can be used to remove residual compounds. Generally, stripping can be accomplished by means of increased temperature, decreased pressure or vacuuming, chemical solvents, steaming, various means of physical agitation, and combinations thereof. Stripping can take place either in one continuous operation or in batch or semi-batch operations. Various stripping processes are known in the art.

U.S. Pat. No. 3,003,930 discloses one stripping method. More specifically, the '930 patent discloses a tower of trays through which a latex solution cascades in order that volatile organic hydrocarbons may be removed. Increased temperature as well as steam or other inert gasses are used to volatize the volatile organic hydrocarbons. Measures are taken to prevent foaming, which obstructs the escape of the VOC vapor from the latex, as well as re-entrainment of VOCs by the latex.

U.S. Pat. No. 5,516,818, discloses a stripping process involving contacting a latex with a small amount of an organic solvent which acts as a stripping aid and subjecting the latex to stripping using steam or an inert gas such as nitrogen. The solvent can be either introduced in the stripping apparatus with the stripping gas, or it can be mixed with the latex prior to introducing the latex into the stripping apparatus. The process of the '818 patent can be carried out in a batch or semi-batch mode.

U.S. Pat. No. 6,353,087 discloses a stripping process, wherein a dispersion is heated and an inert gas such as steam is sparged through the dispersion to remove VOCs. This process also utilizes an agitator and a mechanical foam breaker. The '087 patent also teaches the use of combinations of: (1) increasing the pH of the dispersion prior to and during stripping from 7 to 11, and (2) maintaining the temperature of the dispersion at from 30° C. to 70° C. during stripping. In some embodiments, a vacuum is used so that stripping can be performed at lower temperatures.

U.S. Patent Application Publication No. 2006/0270815, entitled Polymerization of Diisopropenylbenzene, discloses the use of vacuum distillation to remove residual compounds from latex, which may be used in paint.

In accordance with one particular aspect of the present invention, a polymer latex dispersion is treated by steam stripping at about 85° C. to 97° C. and applying vacuum. Excessive foaming is controlled by the degree of vacuum applied.

A distinct but related process called chemical chasing involves adding chemicals that react with residual compounds. Such chemicals include, but are not limited to, tertiary butyl hydroperoxide, ammonium persulfate, potassium persulfate, or sodium persulfate which, for example, may react with carbon-carbon double bonds of the residual compounds. Chemical chasing can be used alone or with stripping to further reduce residual compounds.

Yet another means of removing undesired material from polymer dispersions involves contacting the dispersion with a stripping medium, such as steam or gas, in the presence of an adsorbent material such as carbon black, activated charcoal, silica gel, aluminum oxide and ferric oxide. For instance, in U.S. Pat. No. 6,348,636, discrete quantities of the particulate adsorbent material are provided in latex permeable flow-through enclosures (e.g., in a manner analogous to teabags). Preferred adsorbent materials of the '636 patent include activated carbon, e.g., Cal 12×40, a granular decolorizing carbon sold by Calgon Carbon Corporation.

Columns or ion exchange columns may also be used to purify latex of residual monomers. For example, U.S. Pat. No. 4,130,527 discloses that a residual monomer, such as vinyl chloride monomer, can be removed from an aqueous latex polymer, such as polyvinyl chloride, by allowing the latex to flow as a thin liquid film down the inner surface of a substantially vertical column at subatmospheric pressure countercurrent to an ascending flow of steam. In Example 1 of U.S. Pat. No. 5,055,197, an ion exchange column is used to remove residual monomers. Another example of the use of a column apparatus to purify polymer dispersions is disclosed in U.S. Pat. No. 6,740,691. In the '691 patent, a latex/dispersion is cascaded down a column equipped with internals in countercurrent flow with water vapor and/or air. Internals such as random packing, structured packing and especially trays are disposed through the column to provide multiple stages of mass transfer.

All references relating to removing or treating residual compounds discussed above are incorporated herein by reference in their entireties. In an alternate embodiment of the present invention, not all of the latex in aqueous composition is treated to removal residual compounds, so long as the total amount of residual compounds and preferably the amount of unreacted monomers is less than about 50 ppm. In this alternate embodiment, the latex polymer dispersion may have a blend comprising up to about 30% untreated latex, more preferably up to about 25% untreated latex, and most preferably up to about 20% untreated latex. In one particular example of this alternate embodiment, a latex polymer dispersion may have a blend of about 80% treated latex and about 20% untreated latex with less than about 50 ppm of residual compounds (or unreacted monomers). Preferably, the amount of residual compounds (or the unreacted monomers) of all the latexes is less than about 50 ppm, less than about 40 ppm, less than about 30 ppm, less than about 25 ppm, less than about 20 ppm or less than about 10 ppm.

Alternatively, the treated latex whether making up all or most of the latex used to make the paint or coating composition, can be treated by various methods described above. For example, the treated latex may comprise latex that have been stripped and latex that have been chased or latex that have been otherwise treated. In one non-limiting example, 70-90% of the treated latex have been stripped and 10-30% of the treated latex have been chased. Blend of treated latex and possibly untreated latex can be used, so long as the limit of residual compounds and preferably the unreacted monomers in all of the latexes is less than about 50 ppm, preferably less than about 40 ppm, less than about 30 ppm, less than about 25 ppm and more preferably less than about 20 ppm or less than about 10 ppm, as discussed above.

The treated latex compositions can be included in a paint or other coating composition, which can advantageously be a dispersion further containing water, and additives such as a coalescence agent, a pH adjustor, a surfactant, a defoamer, a color pigment, an opacifying/extender pigment, optionally but preferably a dispersant, optionally but preferably a rheology modifier, and optionally but preferably a biocide or preservative. The latex, pigments and other additives are selected such that the components, individually and in combination, have de minimis volatile emissions, low odor, and performance and paint properties similar to those of premium paints. As mentioned above, Examples 1-4 illustrate that the inventive aqueous coating compositions have de minimis volatile emissions in comparison to conventional paints. Example 5 below illustrates that the inventive aqueous coating compositions, either tinted or untinted, have a lower odor than conventional paints. The Comparative Odor Intensity Index value, as discussed below, is less than about 2.0, more preferably less than about 1.5. Examples 6 and 7 below illustrate that the inventive aqueous coating composition has a VOC value, measured either as a material VOC or coating VOC value, that is significantly lower than conventional zero-VOC paints, i.e., less than about 3.0 g/L, preferably less than about 2.0 g/L, more preferably less than about 1.5 g/L, most preferably less than about 1.0 g/L. Example 8 below illustrates that the inventive aqueous coating composition has dry film properties that are generally better than or equal to a premium aqueous coating composition. Example 9 below illustrates that the inventive aqueous coating composition has superior contrast ratio and hiding power values than conventional zero-VOC paints, i.e. a contrast ratio greater than about 0.990, more preferably greater than about 0.995, most preferably greater than about 0.997.

Returning to discussion of suitable additives for use in the aqueous paint composition, "coalescence solvents," also known as "coalescence aids," "coalescents" or "coalescing agents," are compounds that bring together polymeric components in latex paints to form films. Coalescence aids facilitate the formation of the dried film by temporarily plasticizing, i.e. softening, the latex polymers and subsequently evaporating from the dried film. They can be used, in conjunction with monomers that give rise to polymers of moderately harder characteristics or high Tg values, to make paints with sufficient resistance properties at low application temperature. However, odors derived from the evaporation of the volatile coalescence aids, such as 2,2,4-trimethyl-1,3-pentanediol monoisobutyrate (Texanol EA), are undesirable. But if volatile coalescence aids are to be avoided all together, paints for low temperature application should use predominantly monomers that give rise to polymers of relatively softer characteristics or low Tg values. The paints derived from latex using softer polymers show soft and tacky properties. Coalescence aids with de minimis volatile emissions are those compounds that enhance the polymers to form dried films without the accompanying odors.

Suitable coalescence aids with de minimis volatile emissions, include organic compounds with boiling points above about 220° C., preferably above about 250° C. and more preferably above about 270° C., and therefore do not evaporate or flash, i.e. non-volatile, at expected indoor and outdoor temperatures, and may not be detected using EPA Method 24. Some of these coalescence aids eventually form chemical bonds with polymers, and become a part of the polymer binder. These coalescence aids work as plasticizers that soften the latex polymer particles for film formation. Unlike traditional coalescence solvents that evaporate from paints once they are dried, coalescence aids with de minimis volatile emissions stay in the dried paint films for an indefinite period of time. Due to the tendency to render the paint films soft and tacky for short periods, preferably these coalescence aids are modified as presented in this invention.

An example of a suitable coalescence aid is Optifilm Enhancer 300, which is a low-VOC, low odor "green" coalescent for emulsion paints. See "Optifilm Enhancer 300, A Low Odor, Non-VOC, 'Green' Coalescent for Emulsion Paint," Eastman Chemical Company, Publication M-AP315, April 2005. Optifilm Enhancer 300 can be applied to a variety of architectural coatings. With a boiling point of 281° C. and an empirical formula of $C_{16}H_{30}O_4$, it is a non-volatile organic compound that is particularly suitable for low odor flat and semi-gloss (including soft sheen, satin, vinyl silk and eggshell) interior wall paints. See "Eastman Coatings Film Technologies: Film Optimization for Architectural Coatings," Eastman Chemical Company, 2005.

Another suitable coalescence aid is Optifilm Enhancer 400, which is a very low VOC, low odor coalescent that gives good film integrity, touch-up properties and scrub resistance. With a boiling point of 344° C., Optifilm Enhancer 400 is an alternate to ortho-phthalates such as butyl benzyl phthalate (BBP) and dibutyl phthalate (DBP) as plasticizers. See "Optifilm Enhancer 400—A Non-Phthalate Alternate," Eastman Chemical Company, Publication TT-75, May 2006. Optifilm Enhancer 400 is able to reduce the minimum film forming temperature (MFFT) of various latexes in a more efficient manner than BBP. Because Optifilm Enhancer 400 becomes an integral part of the paint film, it adds to the flexibility of the paint coating.

Another suitable coalescence aid is Archer Reactive Coalescent (Archer RC™), which is a propylene glycol monoester of unsaturated fatty acids derived from vegetable oils. Archer RC™ is found to be nonvolatile when tested by EPA Method 24, possibly due to the oxidation and subsequent crosslinking of its unsaturated component.

Another example of suitable coalescence is BASF Pluracoat™ CA 120 (ES8511). The Pluracoat™ brand additives are organic liquid based on proprietary technology from BASF. They contain zero-VOC and can be used as coalescent aid for low- or zero-VOC latex paints.

Additional conventional examples of suitable low- or zero-VOC coalescing agents that may be used in the present invention in amounts that would not significantly increase the composition's VOC include, but are not limited to, dicarboxylic/tricarboxylic esters, such as trimethyl trimellitate (TMTM), tri-(2-ethylhexyl)trimellitate (TEHTM-MG), tri-(n-octyl,n-decyl)trimellitate (ATM), tri-(heptyl,nonyl)trimellitate (LTM) and n-octyl trimellitate (OTM); adipates, such as bis(2-ethylhexyl)adipate (DEHA), dimethyl adipate (DMAD), monomethyl adipate (MMAD) and dioctyl adipate (DOA); sebacates, such as dibutyl sebacate (DBS); maleates such as dibutyl maleate (DBM) and diisobutyl maleate (DIBM). Other low- or zero-VOC coalescing agents include benzoates, epoxidized vegetable oils, such as N-ethyl toluene sulfonamide, N-(2-hydroxypropyl)benzene sulfonamide and N-(n-butyl)benzene sulfonamide; organophosphates, such as tricresyl phosphate (TCP) and tributyl phosphate (TBP), triethylene glycol dihexanoate, and tetraethylene glycol diheptanoate. Examples of commercial low- and zero-VOC coalescing agents are benzoate esters or alkyl benzoate esters, such as those sold under Benzoflex® and Velate®, and low molecular weight polyesters, such as those sold under Admex®.

When present, the coating compositions according to the invention can contain from about 0.01% to about 10% by weight, for example from about 0.02% to about 8% by weight, from about 0.05% to about 7% by weight, or from about 0.1% to about 5% by weight of the coalescing agent(s).

Examples of pH adjustors useful in the compositions according to the invention can include, but are not limited to, sodium hydroxide, sodium carbonate, sodium bicarbonate, potassium hydroxide, potassium carbonate, potassium bicarbonate, and the like, and combinations thereof. In a preferred embodiment, ammonia, aminoalcohols (e.g., 2-amino-2-methyl-1-propanol and/or those compounds sold under the trade name AMP™ 95 by Angus Chemical Co.), and ammonium salts are specifically excluded from the aqueous paint composition because they are volatile compounds having a pungent odor. In certain cases, compounds that qualify as pH adjustors can be added for purposes other than adjusting pH (e.g., temporary deactivation of otherwise reactive functional groups, emulsion stabilization, or the like), and yet are still characterized herein as pH adjustors.

The compositions according to the invention can advantageously exhibit a pH from about 6 to about 10, for example from about 6.5 to about 8.5 or from about 7.5 to about 9.5, although the pH needs only to be sufficient to maintain the stability of the particular composition, in combination with any additives present.

Examples of surfactants useful in the compositions according to the invention can include, but are not limited to, nonionic and/or anionic surfactants such as ammonium nonoxynol-4 sulfate, nonylphenol (~10 mol %) ethoxylate, nonylphenol (~40 mol %) ethoxylate, octylphenol (~40 mol %) ethoxylate, octylphenol (~9-10 mol %) ethoxylate, sodium dodecyl sulfonate, sodium tetradecyl sulfonate, sodium hexadecyl sulfonate, polyether phosphate esters, alcohol ethoxylate phosphate esters, those compounds sold under the trade name Triton™ (e.g., QS series, CF series, X series, and the like), those compounds sold under the trade name Igepal™, those compounds sold under the trade name Rhodapon™, those sold under the trade name Rhodapex™, those compounds sold under the trade name Rhodacal™, those compounds sold under the trade name Rhodafac™, and the like, and combinations thereof.

Examples of defoamers useful in the compositions according to the invention can include, but are not limited to, polysiloxane-polyether copolymers such as those sold by Tego under the trade name Foamex™, those sold under the trade name BYK™, those sold under the trade name Drewplus™, those sold under the trade name Surfynol™, and the like, and combinations thereof.

While typically multiple pigments/colorants are used in paint or architectural coating applications, sometimes only a white pigment, such as a zinc oxide and/or a titanium dioxide ($TiO_2$) in both anastase and rutile forms is added in the early stages of the formation of the paint composition (e.g., in the base composition). In such a case, any other desired pigments/colorants of various colors (including more white pigment) can optionally be added at the later stages of, or after, the formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention. The color pigments are preferably colorants with de minimis volatile emissions.

Additionally or alternately, opacifying/extender pigments can be added, e.g., to the grind composition portion of the paint composition. Such opacifying/extender pigments generally provide background color to the compositions and thus can be used to minimize colorant costs and/or modify or enhance certain properties of the coating composition (such as hiding power, abrasion resistance, washability, scrubability, absorption (or permeability into the substrate), and drying time). Examples of opacifying/extender pigments useful in the paint compositions according to the invention can include, but are not limited to, nepheline syenites, silica (silicon dioxide), silicates including without limitation talc (magnesium silicate) and clays (aluminum silicate) such as calcined kaolin clays and delaminated kaolin clays, calcium carbonate in both the ground and precipitated forms, aluminum oxide, magnesium oxide, sodium oxide, potassium oxide, barytes (barium sulfate), zinc sulfite, gypsums (i.e., hydrated calcium sulphates), micas, lithophones, wallastonites, and bismuth oxychlorides, and the like. Further discussion of opacifying/extender pigments can be found in U.S. Pat. No. 6,638,998 and U.S. Patent Publication No. 2007/0116879, which are incorporated herein by reference in their entireties.

Titanium dioxide is a good reflector of light and provides the coating compositions with improved hiding power. Suitable titanium dioxides are available under the TI-PURE® (DuPont Company, Wilmington, Del.), TIONA® (Millennium Chemicals, Md.), TRONOX® (Tronox Incorporated, Okla.), TIONA® TR-90 and TRONOX® CR-826.

Useful nepheline syenite pigments are typically nodular particles. A suitable nepheline syenite is marketed under the trade name MINEX® (e.g., MINEX® 7) (Unimin Corporation, Connecticut). Other suitable non-tinting filler/base pigments include but are not limited to calcined kaolin clays marketed under the OPTIWHITE® trade name including OPTIWHITE® MX (Burgess Pigment Company, Sandersville, Ga.).

Examples of dispersants useful in the compositions according to the invention can include, but are not limited to, hydrophobic copolymers such as Tamol™ 165A and carboxylated polyelectrolyte salts such as Tamol™ 731A from Rohm and Haas Company of Philadelphia, Pa., and the like, and combinations thereof Tripolyphosphate salts and tetrapotassium pyrophosphate can also be used to disperse the tinting colorants and/or the non-tinting filler/base pigments(s) in the coating compositions. A suitable tripolyphosphate salt is potassium tripolyphosphate (commercially available from Innophos of Cranbury, N.J.).

Examples of rheology modifiers useful in the compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Rohm & Haas under the trade name Acrysol™, such as RM-8W, RM-5000, and RM-2020 NPR, RM-5, TT-935, and Natrasol™, Natrasol Plus™ and Aquaflow™ from Aqualon Division of Hercules Inc. of Wilmington, Del., and UCAR Polyphobe™ from Dow.

Examples of biocides/preservatives useful in the compositions according to the invention can include, but are not limited to, zinc omadine, hydroxy-functional aza-dioxabicyclo compounds such as those commercially available from ISP under the trade name Nuosept™ 498, those compounds sold under the trade name SKANE™, isothiazolones such as those sold under the trade name Kathon™, Polyphase™ additives from Troy Corp. and the like, and combinations thereof. The use of zinc omadine as a mildewcide is advantageous because it reduces odor.

Paints can be manufactured to have a desired degree of gloss or shininess, as discussed in U.S. Pat. No. 6,881,782. Paint gloss is defined using ASTM Test Method D523 "Standard Test Method for Specular Gloss." Gloss ratings by this test method are obtained by comparing the reflectance from the specimen (at an angle of 20°, 60°, or 85° measured from the vertical) to that from a polished glass standard. Gloss readings at 20° describe the "depth" of gloss and are typically only used to describe gloss or semi-gloss paints. Gloss readings at 60° are used to describe most paints, except for completely flat paints. Gloss readings at 85° describe the "sheen" of flat, eggshell, and satin paints.

Typically, paints are categorized by their gloss values. For example, the Master Paint Institute (MPI) categorizes paints as follows:

TABLE 1

The Reflectivity of Paints with Different Gloss At Different Angles

| Type of Paint Finish | 20° Gloss | 60° Gloss | 85° Gloss |
|---|---|---|---|
| High Gloss | 20-90 | 70-85+ | — |
| Semi-Gloss | 5-45 | 35-70 | — |
| Satin | — | 20-35 | min. 35 |
| Eggshell | | 10-25 | 10-35 |
| Flat/Matte | | 0-10 | max. 35 |

Flatter paints can be produced using various approaches. One approach is to increase the pigment volume concentration (that is, the ratio by volume of all pigments in the paint to total nonvolatiles) (PVC) of the paint above its critical pigment volume concentration (CPVC). At the CPVC, many physical and optical properties of paint change abruptly and the paint changes from a semi-gloss paint to a flat paint.

Federal and state regulations in the United States limit the amount of VOCs permitted in coatings, with the strictest regulations limiting VOC content to 50 grams per liter. A recent New York Times article, previously incorporated by reference, notes that although consumers welcome the environmental and health benefits of low-VOC coatings, they worry that such coatings result in relatively poor performance. The article noted that consumers are concerned that low-VOC aqueous paints require several coatings and do not emulate the sheen and consistency of oil-based paints. By way of example, the article mentioned that a painter advised her "clients to expect to spend more time and money on jobs using low-V.O.C. paints, given that she has to use five coats to achieve the same coverage she gets with two coats of traditional latex paint. 'I just wish they could get the product to really perform as well as the other products,' she said of the manufacturers." Thus, there is a long-felt need to produce a low-VOC or zero-VOC paint, or more preferably a paint with de minimis volatile emissions, with good performance. The present invention addresses this long felt need, and addresses the failures of paint manufacturers to produce a high performance paint with de minimis volatile emissions.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

In the Examples below, inventive aqueous paints were compared to conventional paints in order to demonstrate that the inventive aqueous paints unexpectedly exhibit better performance as well as lower emissions, lower material VOC and coating VOC content, lower odor and de minimis volatile emissions. Table 2 lists, in order of addition, representative quantities of ingredients that are used to formulate an inventive medium base eggshell paint. Most notably, the aqueous coating composition comprises an acrylic latex polymer dispersion that is treated to remove residual compounds. As discussed above, the residual compounds can be removed by means of various treatments discussed above including, but not limited to, stripping. Other components include pigments and additives with de minimis volatile emissions. The formula in Table 2 is a representative formula, and a person having ordinary skill in the art may vary the formula to produce alternative compositions of an inventive aqueous paint with an eggshell finish or other finishes including, but not limited to, flat, satin, semi-gloss, and gloss.

TABLE 2: Representative Formula for Inventive Medium Base Eggshell Paint

| Ingredient | Quantity (pounds) |
|---|---|
| Water | 179.0 |
| NATROSOL PLUS 330 (Rheology Modifier - Thickener) | 1.0 |
| KTPP (tetrapotassium pyrophosphate) | 1.0 |
| Dispersant | 10.0 |
| TiO$_2$ Pigment | 104.9 |
| OPTIWHITE MX (Filler/Pigment - Extender Pigment) | 32.3 |
| MINEX 7 (Filler/Pigment - Extender Pigment) | 70.6 |
| SURFYNOL Defoamer | 0.9 |
| Grind | |
| Potassium Carbonate (pH Adjustor) | 2.3 |
| NUOSEPT Preservative | 2.0 |
| Zinc Omadine (mildewcide) | 2.0 |
| Anionic Surfactant | 2.0 |

-continued

| Ingredient | Quantity (pounds) |
| --- | --- |
| Non-ionic Surfactant | 4.4 |
| Non-VOC coalescent | 4.0 |
| Treated Acrylic Latex* | 484.0 |
| ACRYSOL RM-2020 (Rheology Modifier - Thickener) | 21.2 |
| Water | 58.8 |
| NATROSOL Plus 330 (Rheology Modifier) | 5.0 |
| SURFYNOL Defoamer | 8.0 |
| Water | 6.8 |

*Treated ACRONAL OPTIVE ® 130 (BASF Architectural Coatings) or an in-house stripped acrylic latex with less than about 50 ppm of unreacted acrylic monomers.

Example 1

Volatile Emissions of Untinted Paint Samples, Detected by Environmental Chamber Test Example 1 illustrates that an inventive untinted flat aqueous paint (Example 1A), comprising a latex polymer dispersion with substantially no residual compounds, i.e., a treated latex, emits lower levels of volatile emissions (e.g., total volatile organic compounds (TVOC), formaldehydes, and total aldehydes) after a twenty-four (24) hour period, compared to other untinted flat aqueous paints. The comparative paints include a paint that is similar to the inventive paint except that it comprises a latex polymer dispersion with residual compounds, i.e., an untreated latex (Example 1B); a conventional, commercially available zero-VOC paint (Example 1C); and a conventional, commercially available paint with VOC levels less than about 100 g/L (Example 1D).

Experimental data for Examples 1A-1D were obtained through an environmental chamber test following ASTM D-5116, which measures volatile emissions as a coating composition dries to form a film. Analysis was based on EPA Method IP-B and ASTM D-6196 for VOCs by thermal desorption followed by gas chromatography/mass spectrometry, and EPA IP-6A and ASTM D-5197 for selected aldehydes by high performance liquid chromatography. The 168 hour predicted concentrations were based on a standard wall usage (28.1 $m^2$) in a room with ASHRAE 62.1-2007 ventilation conditions (32 $m^3$ in volume and 0.72 ACH) and assumed decay parameters ($k_T$=0.020; $k_F$=0.010; $k_A$=0.015). The results for Examples 1A-1D are presented below in Tables 3-4 as well as in FIG. 1.

TABLE 3

24 Hour Emission Factors for Examples 1A-1D

|  | Total VOC ($\mu g/m^2 \cdot hr$) | Formaldehydes ($\mu g/m^2 \cdot hr$) | Total Aldehydes ($\mu g/m^2 \cdot hr$) | Total ($\mu g/m^2 \cdot hr$) |
| --- | --- | --- | --- | --- |
| Inventive Example 1A | 23.0 | BQL* | 2.9 | 25.9 |
| Comparative Example 1B | 123 | 3.6 | 14.4 | 141.0 |
| Comparative Example 1C | 55.0 | 51.3 | 63.7 | 170.0 |
| Comparative Example 1D | 764 | 3.7 | 18.3 | 786.0 |

*BQL denotes below quantifiable level of 0.1 µg based on a standard 45 L air collection volume for formaldehyde.

TABLE 4

168 Hour Predicted Concentrations for Examples 1A-1D

|  | Total VOC ($mg/m^3$) | Formaldehydes (ppm) | Total Aldehydes (ppm) |
| --- | --- | --- | --- |
| Inventive Example 1A | 0.002 | <0.001 | <0.001 |
| Comparative Example 1B | 0.008 | 0.001 | 0.001 |
| Comparative Example 1C | 0.004 | 0.012 | 0.012 |
| Comparative Example 1D | 0.05 | 0.001 | 0.001 |

The aforementioned data presented in Table 3, as well as FIG. 1, indicate that the inventive aqueous coating composition of Example 1A exhibits a significantly lower volatile emissions after a 24 hour period (i.e., about 26 $\mu g/m^2 \cdot hr$) than comparative Example 1B (about 141 $\mu g/m^2 \cdot hr$), comparative Example 1C (about 170 $\mu g/m^2 \cdot hr$), and comparative Example 1D (about 786 $\mu g/m^2 \cdot hr$). Thus, the inventive aqueous paint composition of Example 1A, comprising a treated latex, has volatile emissions at least five times lower than comparative examples 1B-1D.

The aforementioned data presented in Table 4 also indicate that the inventive aqueous coating composition of Example 1A is predicated to have significantly lower concentrations of volatile species, total VOC (i.e., about 0.002 $mg/m^3$) as well as formaldehydes (i.e., <0.001 ppm) and total aldehydes (i.e., <0.001 ppm), after 168 hours than comparative examples 1B-1D. For instance, the inventive aqueous paint composition of Example 1A, comprising a treated latex, is predicted to have a total VOC concentration at least two times lower than comparative Examples 1B-1D.

Example 2

Volatile Emissions of Tinted Paint Samples, Detected by Environmental Chamber Test Example 2 illustrates that an inventive tinted eggshell aqueous paint (Example 2A), comprising a latex polymer dispersion with substantially no residual compounds, i.e., a treated latex, emits lower levels of volatile emissions, in particular lower levels of total volatile organic compounds (TVOC), after a four (4) hour period compared to conventional tinted eggshell aqueous paints, Examples 2B-2E. Moreover, even after a twenty-four (24) hour period, the inventive aqueous paint (Example 2A) emits lower levels of volatile emissions compared to most conventional tinted eggshell aqueous paints, i.e., Examples 2B, 2D, and 2E.

The comparative paints include a first conventional, commercially available zero-VOC paint (Example 2B); a second conventional, commercially available zero-VOC paint (Example 2C); a third conventional, commercially available low-VOC paint (Example 2D); and a fourth conventional, commercially available low-VOC paint (Example 2E). Examples 2A and 2C-2E were tinted to Benjamin Moore Color 2022-20 (Sun Kissed Yellow) and Example 2B was tinted to ICI Color FA021 (Ginger Palm). Example 2A was tinted using an in-house zero-VOC colorant and Examples 2B-2E were tinted using off-the-shelf colorants.

The experimental data for Examples 2A-2E were obtained through an environmental chamber test following ASTM D-5116, which, as mentioned above, measures volatile emissions as a coating composition dries to form a film. The data is synopsized below in Table 5 and FIG. 2, which present emission factor values after 4 hours and 24 hours. Table 5 also lists the number of emissive species that are detected at 4 hours and 24 hours.

TABLE 5: Emission Factors for Examples 2A-2E

| Sample | 4 Hour Emission Factor ($\mu g/m^2 \cdot hr$) | 24 Hour Emission Factor ($\mu g/m^2 \cdot hr$) | Number of Emissive Species Detected after 4 Hours | Number of Emissive Species Detected after 24 Hours |
|---|---|---|---|---|
| Inventive Example 2A | 358 | 246 | 4 | 4 |
| Comparative Example 2B | 1057 | 273 | 12 | 5 |
| Comparative Example 2C | 1379 | 233 | 5 | 3 |
| Comparative Example 2D | 3162 | 669 | 15 | 9 |
| Comparative Example 2E | 6839 | 1106 | 27 | 13 |

The aforementioned data, presented in Table 5 and FIG. 2, indicate that the inventive aqueous coating composition of Example 2A exhibits a significantly lower volatile emissions after a 4 hour period (i.e., about 358 $\mu g/m^2 \cdot hr$) than comparative Example 2B (about 1057 $\mu g/m^2 \cdot hr$), comparative Example 2C (1379 $\mu g/m^2 \cdot hr$), comparative Example 2D (3162 $\mu g/m^2 \cdot hr$), and comparative Example 2E (6839 $\mu g/m^2 \cdot hr$). Thus, the inventive aqueous paint composition of Example 2A, comprising a treated latex, has volatile emissions at least about three times lower than the closes of comparative Examples 2B-2E after a 4 hour period.

The aforementioned data presented in Table 5 and FIG. 2 also indicate that the inventive aqueous coating composition of Example 2A exhibits lower volatile emissions after a 24 hour period (i.e., about 246 $\mu g/m^2 \cdot hr$) than comparative Example 2B (about 273 $\mu g/m^2 \cdot hr$), comparative Example 2D (669 $\mu g/m^2 \cdot hr$), and comparative Example 2E (1106 $\mu g/m^2 \cdot hr$). Example 2C has an emission factor value of 233 $\mu g/m^2 \cdot hr$, which is only about 5% lower than Example 2A's emission factor value of 246 $\mu g/m^2 \cdot hr$. Thus, even after a 24 hour period, the inventive aqueous paint composition of Example 2A, comprising a treated latex, has lower volatile emissions than most conventional tinted eggshell paints.

When both sets of emission factor values are considered, i.e., values measured after 4 hours and 24 hours, it is apparent that inventive Example 2A exhibits the best overall performance. More particularly, Example 2A is the only sample that exhibits both (i) de minitnis volatile emissions under the second definition noted above, i.e., a volatile emission factor of less than about 500 $\mu g/m^2 \cdot hr$, as measured according to ASTM D-5116 after a four hour period, and (ii) an even lower volatile emission factor as measured after a twenty-four hour period.

Examples 2A-2E substantially correspond to Examples 4A-4E and Examples 7A-7E noted below. When all three Examples are considered in tandem, it is apparent that the inventive aqueous paint sample of Examples 2A, 4A, and 7A is the only one that consistently exhibits the best overall performance as measured under three different methodologies, i.e. an environmental chamber test (Example 2), a 120° C. headspace analysis (Example 4), and material VOC and coating VOC content (Example 7).

Example 3

Volatile Emissions Detected by 70° C. and 120° C. Headspace Analyses for Flat Paint Samples Example 3 demonstrates that an inventive flat aqueous paint (Example 3A), comprising a latex polymer dispersion with substantially no residual compounds, i.e., a treated latex, has lower volatile emissions as measured by a 70° C. headspace method, compared to other flat aqueous paints. The comparative paints include a paint that is similar to the inventive paint except that it comprises a latex polymer dispersion with residual compounds, i.e., an untreated latex (Example 3B); a conventional, commercially available zero-VOC paint (Example 3C); and a conventional, commercially available paint with VOC levels less than about 100 g/L (Example 3D).

Examples 3A-3D were studied by headspace analysis, which is a chromatographic tool also known as headspace gas chromatography/mass spectrometry (HGCMS). Headspace analysis can be used to identify and quantify components that emanate from a bulk solid or liquid at a given temperature. In other words headspace analysis detects volatile emissions from an aqueous solution in the bulk state at a specified temperature, as opposed to an environmental chamber test that measures volatile emissions as a coating composition dries to form a film.

More specifically, for Examples 3A-3D, a headspace sample was obtained and collected over a period of 12.5 minutes at a temperature of 70° C. from a 1.0 g sample held in a 10 ml sample tube that was swept with dry helium at a flow rate of 1.0 ml/min and a pressure of 13.3 psig throughout the sampling period. Then the headspace sample was analyzed by HGCMS. A 70° C. temperature headspace analysis detects volatile emissions under conditions that mimic odor exposure.

The 70° C. headspace analysis results for untinted and organic yellow tinted samples of Examples 3A-3D are presented below in Table 6 and FIG. 3A, which identify the quantity of discrete volatile emissions in part per million. Table 6 also lists VOC content as measured by EPA Method 24.

TABLE 6

| | Volatile Emissions for Examples 3A-3D - 70° C. Headspace Analysis | | | | | | | |
|---|---|---|---|---|---|---|---|---|
| | Inventive Example 3A Quantity (ppm) | | Comparative Example 3B Quantity (ppm) | | Comparative Example 3C Quantity (ppm) | | Comparative Example 3D Quantity (ppm) | |
| Analyte | Untinted | Tinted | Untinted | Tinted | Untinted | Tinted | Untinted | Tinted |
| Acetaldehyde | ND* | ND | ND | ND | 52 | 30 | 0 | ND |
| Benzaldehyde | ND | ND | ND | ND | ND | ND | 4 | 6 |
| Butyl alcohol | 2 | 11 | 35 | 34 | 30 | 17 | 139 | 110 |
| Butyl propionate | 2 | 3 | 21 | 20 | 27 | 30 | 25 | 23 |

TABLE 6-continued

Volatile Emissions for Examples 3A-3D - 70° C. Headspace Analysis

| Analyte | Inventive Example 3A Quantity (ppm) | | Comparative Example 3B Quantity (ppm) | | Comparative Example 3C Quantity (ppm) | | Comparative Example 3D Quantity (ppm) | |
|---|---|---|---|---|---|---|---|---|
| | Untinted | Tinted | Untinted | Tinted | Untinted | Tinted | Untinted | Tinted |
| Butyl acetate | 2 | 1 | 2 | 2 | 5 | 54 | 7 | 6 |
| Methyl methacrylate | ND | ND | 76 | 74 | ND | ND | ND | ND |
| Butyl ether | 1 | 8 | 80 | 75 | 70 | 64 | 136 | 126 |
| Isopropyl alcohol | ND | ND | ND | ND | ND | ND | 56 | 69 |
| Ethyl Alcohol | ND | ND | ND | ND | 8 | 8 | ND | ND |
| Methyl isobutyrate | ND | 8 | 3 | 2 | ND | ND | ND | ND |
| Ethyl acetate | ND | ND | ND | ND | ND | 30 | ND | ND |
| t-Butyl alcohol | 8 | 9 | 168 | 164 | 71 | 62 | 39 | 44 |
| Acetone | ND | ND | 63 | 62 | 80 | 78 | 25 | 36 |
| Total | 15 | 40 | 448 | 433 | 343 | 373 | 431 | 420 |
| NVM** | 54.2% | 53.1% | 53.9% | 52.8% | 55% | 56% | 51.4% | 51.6% |
| Water | 46.6% | 47.4% | 47.3% | 47.6% | 47% | 46% | 46.0% | 42.7% |
| Weight/Gallon | 10.27 lbs. | 10.27 lbs. | 10.27 lbs. | 10.24 lbs. | 11.48 lbs. | 11.32 lbs. | 10.59 lbs. | 10.68 lbs. |
| VOC (Method 24 minus water) | 0 g/L | 0 g/L | 0 g/L | 0 g/L | 0 g/L | 0 g/L | 81 g/L | 160 g/L |

*ND = None Detected
**= Non-Volatile Matter

The aforementioned data presented in Table 6 and FIG. 3A indicate that the inventive aqueous coating composition of Example 3A has significantly lower volatile emissions (i.e., about 15 ppm untinted/40 ppm tinted), as detected by a 70° C. headspace analysis, than comparative Example 3B (about 448 ppm untinted/433 ppm tinted), comparative Example 3C (about 343 ppm untinted/373 ppm tinted), and comparative Example 3D (about 431 ppm untinted/420 ppm tinted). The data further indicate the VOC content, as measured by EPA Method 24, is not an adequate indicator of total volatile emissions in an aqueous paint. More specifically, although Examples 3A, 3B, and 3C each have 0 g/L VOC, as measured by Method 24, Examples 3B and 3C have significantly higher levels of volatile emissions than Example 3A.

Examples 3A-3D were also studied by a 120° C. headspace analysis. The 70° C. headspace analysis, as presented above, measures volatile emissions under conditions that closely mimic natural odor exposure, whereas the 120° C. headspace analysis measures volatile emissions under conditions that quantify essentially all detectable volatile compounds. In other words, although the increased temperature range of the 120° C. headspace analysis is not encountered under normal conditions, it allows one to detect a broader range of volatile compounds. Consequently, the volatile emission values detected by a 120° C. headspace analysis are greater than those detected by a 70° C. headspace analysis.

The 120° C. headspace analysis results for untinted and organic yellow tinted samples of Examples 3A-3D are presented below in Table 7 and FIG. 3B, which identify the quantity of discrete volatile emissions in part per million. Table 7 also lists VOC content as measured by EPA Method 24.

TABLE 7

Volatile Emissions for Examples 3A-3D - 120° C. Headspace Analysis

| Analyte | Inventive Example 3A Quantity (ppm) | | Comparative Example 3B Quantity (ppm) | | Comparative Example 3C Quantity (ppm) | | Comparative Example 3D Quantity (ppm) | |
|---|---|---|---|---|---|---|---|---|
| | Untinted | Tinted | Untinted | Tinted | Untinted | Tinted | Untinted | Tinted |
| Acetaldehyde | ND* | ND | ND | ND | 24 | 23 | ND | ND |
| Benzaldehyde | ND | ND | ND | ND | ND | ND | ND | ND |
| Butyl alcohol | 23 | 34 | 79 | 85 | 36 | 28 | 106 | 112 |
| Butyl propionate | ND | ND | 83 | 80 | 68 | 58 | 68 | 60 |
| Butyl acetate | ND | ND | 10 | 6 | 7 | 11 | ND | ND |
| Methyl methacrylate | ND | ND | 74 | 85 | ND | ND | ND | ND |
| Butyl ether | 9 | 10 | 200 | 206 | 71 | 141 | 247 | 251 |
| Isopropyl alcohol | ND | ND | ND | ND | ND | ND | 55 | 60 |
| Ethyl Alcohol | ND | 53 | ND | ND | ND | ND | ND | ND |
| Methyl isobutyrate | ND | ND | ND | ND | ND | ND | ND | ND |

TABLE 7-continued

Volatile Emissions for Examples 3A-3D - 120° C. Headspace Analysis

|  | Inventive Example 3A Quantity (ppm) | | Comparative Example 3B Quantity (ppm) | | Comparative Example 3C Quantity (ppm) | | Comparative Example 3D Quantity (ppm) | |
|---|---|---|---|---|---|---|---|---|
| Analyte | Untinted | Tinted | Untinted | Tinted | Untinted | Tinted | Untinted | Tinted |
| Ethyl acetate | ND | ND | ND | ND | ND | 30 | ND | ND |
| t-Butyl alcohol | 33 | 50 | 258 | 260 | 147 | 152 | 59 | 60 |
| Acetone | ND | ND | 61 | 52 | 62 | 93 | 20 | 37 |
| Total | 65 | 147 | 765 | 774 | 415 | 506 | 555 | 580 |
| NVM** | 54.2% | 53.1% | 53.9% | 52.8% | 55% | 56% | 51.4% | 51.6% |
| Water | 46.6% | 47.4% | 47.3% | 47.6% | 47% | 46% | 46.0% | 42.7% |
| Weight/Gallon | 10.27 lbs. | 10.27 lbs. | 10.27 lbs. | 10.24 lbs. | 11.48 lbs. | 11.32 lbs. | 10.59 lbs. | 10.68 lbs. |
| VOC (Method 24 minus water) | 0 g/L | 0 g/L | 0 g/L | 0 g/L | 0 g/L | 0 g/L | 81 g/L | 160 g/L |

*ND = None Detected
**= Non-Volatile Matter

The aforementioned data presented in Table 7 and FIG. 3B further indicate that even when one quantifies essentially all detectable volatile emissions by a 120° C. headspace analysis, the inventive aqueous coating composition of Example 3A still has significantly lower volatile emissions (i.e., about 65 ppm untinted/147 ppm tinted) than comparative Example 3B (about 765 ppm untinted/774 ppm tinted), comparative Example 3C (about 415 ppm untinted/506 ppm tinted), and comparative Example 3D (about 555 ppm untinted/580 ppm tinted). The data again indicate the VOC content, as measured by EPA Method 24, is not an adequate indicator of total volatile emissions in an aqueous paint. More specifically, although Examples 3A, 3B, and 3C each have 0 g/L VOC, as measured by Method 24, Examples 3B and 3C have significantly higher levels of volatile emissions than Example 3A.

Example 4

Volatile Emissions Detected by 120° C. Headspace Analysis for Eggshell Paint Samples Example 4 demonstrates that an inventive eggshell aqueous paint (Example 4A) comprising a latex polymer dispersion with substantially no residual compounds, i.e., a treated latex, has lower volatile emissions, as measured by a 120° C. headspace method, compared to other eggshell aqueous paints. The comparative paints include a first conventional, commercially available zero-VOC paint (Example 4B); a second conventional, commercially available zero-VOC paint (Example 4C); a third conventional, commercially available low-VOC paint (Example 4D); and a fourth conventional, commercially available low-VOC paint (Example 4E). Examples 4A and 4C-4E were tinted to Benjamin Moore Color 2022-20 (Sun Kissed Yellow) and Example 4B was tinted to ICI Color FA021 (Ginger Palm). Example 4A was tinted using an in-house zero-VOC colorant and Examples 4B-4E were tinted using off-the-shelf colorants. The samples used in Examples 4A-4E correspond substantially to Examples 2A-2E above.

The experimental data for Examples 4A-4E were obtained through a 120° C. headspace analysis, discussed above, which quantifies essentially all detectable volatile compounds from an aqueous solution in the bulk state at a specified temperature. The 120° C. headspace analysis results for Examples 4A-4E are presented below in Table 8 and FIG. 4, which identify the quantity of discrete volatile emissions in part per million.

TABLE 8

Volatile Emissions for Examples 4A-4E

| Analyte | Inventive Example 4A Quantity (ppm) | Comparative Example 4B Quantity (ppm) | Comparative Example 4C Quantity (ppm) | Comparative Example 4D Quantity (ppm) | Comparative Example 4E Quantity (ppm) |
|---|---|---|---|---|---|
| Acetaldehyde | — | 31 | 30 | 7 | — |
| Triethylamine | — | — | — | — | — |
| Acetone | 4 | 108 | 80 | 28 | 100 |
| t-Butyl alcohol | 54 | 159 | 155 | 43 | 258 |
| Methyl isobutyrate | — | — | — | — | — |
| Ethyl alcohol | 6 | — | 7 | — | 308 |
| Isopropyl alcohol | — | 309 | 0 | 175 | — |
| n-Butyl ether | 29 | 123 | 138 | 163 | 171 |
| Butyl acetate | — | 14 | — | 4 | 12 |
| 4 Heptanone | — | — | — | — | — |
| Butyl propionate | 10 | 84 | 19 | 86 | 109 |
| Butyl alcohol | 39 | 22 | 38 | 49 | 141 |
| Butyl acrylate | — | — | — | — | — |
| Isopropyl benzene | — | — | — | — | 8* |

TABLE 8-continued

Volatile Emissions for Examples 4A-4E

| Analyte | Inventive Example 4A Quantity (ppm) | Comparative Example 4B Quantity (ppm) | Comparative Example 4C Quantity (ppm) | Comparative Example 4D Quantity (ppm) | Comparative Example 4E Quantity (ppm) |
|---|---|---|---|---|---|
| Propyl benzene | — | — | — | — | 6* |
| Hexanol[1] | — | — | — | — | — |
| Diethylene glycol methyl ether[1] | — | — | — | — | 230* |
| Benzaldehyde | — | — | — | — | — |
| Ethylene glycol | — | 41** | — | 650** | 1,495** |
| Hexadiene | — | 27* | — | — | — |
| Dodecene[2] | — | — | — | 15 | — |
| Decyl alcohol | — | — | 44 | — | — |
| Butyl Cellosolve ® | 56 | — | 3 | — | 4 |
| Butyl Carbitol ® | — | — | — | 32 | 35 |
| Dipropylene glycol | — | — | — | — | 22* |
| Octanol | — | — | 104* | — | — |
| 2 Ethyl Hexanol | — | — | — | — | — |
| 1,2 Dichlorobenzene | 2 | — | — | — | — |
| Texanol ® | — | 18 | — | — | 29 |
| Dodecanol | — | — | — | 5 | — |
| Unknown(s)* | 23* | — | — | 21* | — |
| TOTAL (ppm) | 223 | 936 | 618 | 1,278 | 2,928 |

*Quantitated as toluene
**Quantitated as toluene. A compound specific calibration will be performed.
[1]Mixed isomers
[2]Quantitated as dodecane The aforementioned data presented in Table 8 and FIG. 4 indicate that the inventive aqueous coating composition of Example 4A has significantly lower volatile emissions (i.e., about 223 ppm) than comparative Example 4B (about 936 ppm), comparative Example 4C (about 618 ppm), comparative Example 4D (about 1278 ppm), and comparative Example 4E (about 2928 ppm).

Example 5

Odor Analysis

Example 5 illustrates that an inventive flat aqueous paint (Example 5A), comprising a latex polymer dispersion with substantially no residual compounds, i.e., a treated latex, emits a lower odor, compared to other flat aqueous paints. The inventive Example 5A exhibits zero-VOC. The comparative paints include a paint that is similar to the inventive paint except that it comprises a latex polymer dispersion with residual compounds, i.e., an untreated latex (Example 5B), which also exhibits zero-VOC; a conventional, commercially available zero-VOC paint (Example 5C); and a conventional, commercially available paint with VOC levels less than about 100 g/L (Example 5D).

A Comparative Odor Intensity Index was measured for each of Examples 5A-5D. As used herein, the term "Comparative Odor Intensity Index" is a value representing the odor intensity ranking of a paint sample relative to three other paint samples, where 1 is assigned to a paint sample with the best odor, 2 is assigned to the second best paint sample, 3 is assigned to the third best sample, and 4 is assigned to the worst paint sample. For Example 5, in a blind test a thirty (30) member panel was selected at random to assess the Comparative Odor Intensity Index value for Examples 5A-5D. One set of four untinted samples and one set of four tinted samples (tinted to organic yellow Y2) were presented, in a blind manner, to each panelist for evaluation. Twenty-five (25) grams of each sample was placed in a clean one gallon paint can with a lid. The panelists were asked to rank the samples in each set on a Comparative Odor Intensity Index scale of 1-4, as explained above, after being told to imagine they were going to use the paint in their home and to rank the four paint samples based on odor preference.

The Comparative Odor Intensity Index values for untinted and tinted samples of Examples 5A-5D, as assigned by each panelist P1-P30, is presented below in Table 9A (panelists P1-P15) and Table 9B (panelists P16-P30). The aggregate sums of the Comparative Odor Intensity Index values for untinted and tinted Examples 5A-5D, as assessed by the thirty member panel, are presented below in Table 10 as well as in FIGS. 5A and 5B. Table 10 also presents the mean Comparative Odor Intensity Index values.

TABLE 9A

Comparative Odor Intensity Index Values Assigned by Panelists P1-P15

| Ex. | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|
| 5A | 2 | 1 | 2 | 2 | 1 | 2 | 2 | 3 | 1 | 1 | 1 | 1 | 1 | 1 | 1 |
| 5B | 1 | 2 | 1 | 1 | 2 | 1 | 1 | 1 | 2 | 3 | 2 | 3 | 3 | 2 | 2 |
| 5C | 3 | 3 | 3 | 4 | 3 | 3 | 3 | 2 | 3 | 2 | 3 | 2 | 2 | 3 | 3 |
| 5D | 4 | 4 | 4 | 3 | 4 | 4 | 4 | 4 | 4 | 4 | 4 | 4 | 4 | 4 | 4 |

TABLE 9A-continued

Comparative Odor Intensity Index Values Assigned by Panelists P1-P15

| Ex. | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|
| 5A* | 2 | 2 | 1 | 2 | 1 | 1 | 1 | 1 | 1 | 1 | 1 | 1 | 3 | 1 | 1 |
| 5B* | 1 | 3 | 3 | 3 | 3 | 3 | 3 | 2 | 3 | 2 | 2 | 2 | 1 | 4 | 2 |
| 5C* | 3 | 1 | 2 | 1 | 2 | 2 | 2 | 3 | 2 | 3 | 3 | 3 | 2 | 2 | 4 |
| 5D* | 4 | 4 | 4 | 4 | 4 | 4 | 4 | 4 | 4 | 4 | 4 | 4 | 4 | 3 | 3 |

*= tinted sample

TABLE 9B

Comparative Odor Intensity Index Values Assigned by Panelists P16-P30

| Ex. | P16 | P17 | P18 | P19 | P20 | P21 | P22 | P23 | P24 | P25 | P26 | P27 | P28 | P29 | P30 |
|---|---|---|---|---|---|---|---|---|---|---|---|---|---|---|---|
| 5A | 1 | 2 | 2 | 2 | 3 | 1 | 1 | 1 | 1 | 2 | 1 | 1 | 1 | 2 | 1 |
| 5B | 3 | 1 | 1 | 1 | 1 | 2 | 3 | 3 | 3 | 3 | 3 | 3 | 2 | 1 | 2 |
| 5C | 2 | 3 | 3 | 3 | 2 | 3 | 2 | 2 | 2 | 1 | 2 | 2 | 3 | 3 | 3 |
| 5D | 4 | 4 | 4 | 4 | 4 | 4 | 4 | 4 | 4 | 4 | 4 | 4 | 4 | 4 | 4 |
| 5A* | 1 | 1 | 1 | 1 | 1 | 2 | 1 | 2 | 2 | 2 | 2 | 2 | 2 | 1 | 2 |
| 5B* | 3 | 3 | 4 | 4 | 3 | 1 | 3 | 1 | 1 | 1 | 1 | 3 | 1 | 2 | 1 |
| 5C* | 2 | 2 | 3 | 2 | 2 | 3 | 4 | 3 | 3 | 3 | 4 | 1 | 3 | 3 | 3 |
| 5D* | 4 | 4 | 2 | 3 | 4 | 4 | 2 | 4 | 4 | 4 | 3 | 4 | 4 | 4 | 4 |

*= tinted sample

TABLE 10

Aggregate and Mean Comparative Odor Intensity Index Values for Examples A-5D

| Example | Aggregate/Mean Comparative Odor Intensity Index (Untinted Sample) | Aggregate/Mean Comparative Odor Intensity Index (Tinted Sample) |
|---|---|---|
| Inventive Example 5A | 44/1.47 | 43/1.43 |
| Comparative Example 5C | 59/1.97 | 69/2.3 |
| Comparative Example 5B | 78/2.6 | 76/2.53 |
| Comparative Example 5D | 119/3.97 | 112/3.73 |

The data presented in Tables 9A, 9B, and 10, as well as FIGS. 5A and 5B, indicate that the inventive aqueous coating composition of Example 5A has a lower aggregate and mean Comparative Odor Intensity Index value for both untinted and tinted samples than comparative Examples 5B-5D. Another odor intensity index based on the above data or other data can also be used.

In an independent test conducted by a third-party, *Health Magazine*, the inventive paint (Example 5A), sold under the trade name Benjamin Moore Natura®, was judged as having no odor even up close, and its performance was the best in the group of seven tested paints. The test results are published in the *Health Magazine* article entitled "The Healthiest Paint for You And Your Home" (Roehring, Elizabeth, *Health Magazine*, April 2009), available at online at <http://living.health-.com/2009/03/15/healthy-paint-home/>. Both the print and online publications of the test results are incorporated herein by reference in their entireties.

Example 6

Low Material VOC and Low Coating VOC for Inventive Eggshell Aqueous Paint

Example 6 illustrates that the inventive aqueous coating composition has a lower material VOC content and a lower coating VOC content than conventional zero-VOC paints. A person having ordinary skill in the art would readily understand that material VOC is the actual VOC content of an aqueous coating composition, whereas the coating VOC is the regulatory VOC content that is calculated by discounting water and exempt compounds.

In Example 6, an inventive medium base eggshell paint was formulated and then tinted to a light color, Benjamin Moore (BM) Color 1059 (Example 6A) and a dark color, BM Color 2165-20 (Example 6B) using the GENNEX™ Waterborne colorant system commercially available from Benjamin Moore and Company. Similarly, a first conventional, commercially available zero-VOC paint was also tinted to match BM Color 1059 (Example 6C) and BM Color 2165-20 (Example 6D) using colorants from the same manufacturer that makes the base paints. Likewise, a second conventional, commercially available zero-VOC paint was tinted to a BM Color 1059 (Example 6E) and BM Color 2165-20 (Example 6F).

Examples 6A-6F were analyzed using a slightly modified version of ASTM Method 6886. For each Example, a known mass of paint was added to a vial containing a small quantity of ceramic beads (to aid in mixing) and a known mass of solvent (both acetone and THF were used for each sample) containing a known amount of internal standard (ethylene glycol diethyl ether, EGDE). The sample was mixed well and a 1 microliter sample was injected into a gas chromatograph. Samples of solvent containing EGDE were injected separately. A 30 m×0.25 mm DB-5 column with 1.0 micron film was used. The column temperature was held at 50° C. for 4 minutes followed by 10° C./min ramp to 250° C. Data was typically collected for at least 20 minutes. Flame ionization detector (FID) detection was used. Confirmatory analysis, using mass spectrophotometery (MS) detection, was performed on some samples.

Chromatograms were integrated and the chromatograms of solvent were compared with chromatograms for samples to insure only VOCs coming from the coating were included. When possible, peaks were identified with particular compounds (using both a retention time library and MS analysis) whose known response factors were used in determining mass of VOC in the sample. The mass fraction VOC in the sample was calculated by summing the fractions of individual VOCs.

The density of each sample was determined using a weight per gallon cup. The fraction solids for each sample were determined using ASTM Method 2369. Water fraction was calculated by difference.

Both material VOC and coating VOC were calculated. Material VOC was calculated as:

$$\text{material } VOC \text{ (g/L)} = \frac{\text{grams } VOC}{\text{liters coating}} = f_{VOC} D_P$$

and coating VOC was calculated as:

$$\text{coating } VOC \text{ (g/L)} = \frac{\text{grams } VOC}{\text{liters coating} - \text{liters water}} = \frac{f_{VOC} D_P}{1 - [f_w(D_P/D_w)]}$$

where $D_P$, $f_{VOC}$, and $f_w$ = coating density, VOC fraction, and water fraction, respectively.

Tables 11, 12, and 13 below relate data for the inventive and comparative paint samples 6A-6F. Table 11 presents data for inventive Examples 6A and 6B. Table 12 presents data for comparative Examples 6C and 6D. Table 13 presents data for comparative Examples 6E and 6F.

TABLE 11

Material VOC and Coating VOC for Inventive Examples 6A and 6B

| | Inventive Example 6A Inventive Eggshell Paint (Color 1059) | | Inventive Example 6B Inventive Eggshell Paint (Color 2165-20) | |
|---|---|---|---|---|
| Solvent | Acetone | THF | Acetone | THF |
| Density (g/L) | 1381 | 1381 | 1179 | 1179 |
| Solids Fraction | 0.5936 | 0.5936 | 0.4526 | 0.4526 |
| VOC Fraction | 0.0005 | 0.0010 | 0.0005 | 0.0011 |
| Water Fraction | 0.4059 | 0.4054 | 0.5469 | 0.5463 |
| Water (L) | 0.5608 | 0.5600 | 0.6451 | 0.6444 |
| Material VOC (g/L) | 0.7 | 1.4 | 0.6 | 0.8 |
| Coating VOC (g/L) | 1.5 | 3.1 | 1.7 | 2.3 |

TABLE 12

Material VOC and Coating VOC for Comparative Examples 6C and 6D

| | Comparative Example 6C Comparative Zero VOC Eggshell Paint (Color 1059) | | Comparative Example 6D Comparative Zero VOC Eggshell Paint (Color 2165-20) | |
|---|---|---|---|---|
| Solvent | Acetone | THF | Acetone | THF |
| Density (g/L) | 1279 | 1279 | 1207 | 1207 |
| Solids Fraction | 0.5398 | 0.5398 | 0.4715 | 0.4715 |
| VOC Fraction | 0.0038 | 0.0026 | 0.0170 | 0.0181 |
| Water Fraction | 0.4564 | 0.4576 | 0.5115 | 0.5105 |
| Water (L) | 0.5836 | 0.5851 | 0.6175 | 0.6162 |
| Material VOC (g/L) | 4.8 | 3.3 | 20.5 | 21.8 |
| Coating VOC (g/L) | 11.5 | 7.9 | 53.7 | 56.9 |

TABLE 13

Material VOC and Coating VOC for Comparative Examples 6E and 6F

| | Comparative Example 6E Comparative Zero VOC Eggshell Paint (Color 1059) | | Comparative Example 6F Comparative Zero VOC Eggshell Paint (Color 2165-20) | |
|---|---|---|---|---|
| Solvent | Acetone | THF | Acetone | THF |
| Density (g/L) | 1247 | 1247 | 1207 | 1207 |
| Solids Fraction | 0.4576 | 0.4576 | 0.4189 | 0.4189 |
| VOC Fraction | 0.0034 | 0.0027 | 0.0254 | 0.0258 |
| Water Fraction | 0.5389 | 0.5396 | 0.5556 | 0.5552 |
| Water (L) | 0.6720 | 0.6729 | 0.6709 | 0.6704 |
| Material VOC (g/L) | 4.3 | 5.0 | 30.7 | 31.2 |
| Coating VOC (g/L) | 13.1 | 15.1 | 93.3 | 94.6 |

The data presented in Tables 11-13 indicate that the inventive aqueous coating composition of Examples 6A and 6B, tinted to BM Colors 1059 and 2165-20 respectively, have lower material VOC and coating VOC values when measured in either acetone or THF than the conventional zero-VOC paints of Examples 6C-6F.

Example 7

Low Material VOC and Low Coating VOC for Inventive Eggshell Aqueous Paint

Example 7 further illustrates that the inventive eggshell paint (Example 7A), comprising a latex polymer dispersion with substantially no residual compounds, i.e., a treated latex, has a lower material VOC content and a lower coating VOC content than conventional, commercially available zero-VOC paints. The comparative paints include a first conventional, commercially available zero-VOC paint (Example 7B); a second conventional, commercially available zero-VOC paint (Example 7C); a third conventional, commercially available low-VOC paint (Example 7D); and a fourth conventional, commercially available low-VOC paint (Example 7E). Examples 7A and 7C-7E were tinted to Benjamin Moore Color 2022-20 (Sun Kissed Yellow) and Example 7B was tinted to ICI Color FA021 (Ginger Palm). Example 7A was tinted using an in-house zero-VOC colorant and Examples 7B-7E were tinted using off-the-shelf colorants. The samples used in Examples 7A-7E correspond substantially to Examples 7A-7E.

Examples 7A-7E were analyzed using the modified ASTM Method 6886 discussed above in connection with Example 6. Table 14 below relates data for inventive and comparative paints samples of Examples 7A-7E

TABLE 14

Material VOC and Coating VOC for Examples 7A-7E

| Example | Density (g/L) | Solids fraction | Water fraction | Material VOC (g/L) | Coating VOC (g/L) |
|---|---|---|---|---|---|
| 7A | 1101 | 0.4137 | 0.5860 | 0.3 | 0.8 |
| 7B | 1175 | 0.4376 | 0.5621 | 0.4 | 1.1 |
| 7C | 1181 | 0.4754 | 0.5232 | 1.6 | 4.2 |
| 7D | 1142 | 0.3962 | 0.5707 | 37.8 | 108.7 |
| 7E | 1212 | 0.4794 | 0.4822 | 46.6 | 112.0 |

The data presented in Table 14 again indicates that the inventive aqueous coating composition of Example 7A has a lower material VOC and coating VOC values than the conventional zero-VOC paints of Examples 7B-7E.

Example 8

Dry Film Properties

Example 8 illustrates that the inventive zero-VOC aqueous paint, with de minimis volatile emissions, exhibits dry film properties that are relatively better than or equal to a conventional-VOC paint or a commercial zero-VOC paint. As shown in Table 15 below, selective dry film properties were studied for the inventive and premium, conventional-VOC aqueous paints having a flat, eggshell, and semi-gloss finish. Further for each paint finish, selective dry film properties were studied for different bases (1-Base, 2-Base, 3-Base, 4-Base). The different base levels represent the amount of $TiO_2$ in the aqueous paint. 1-Base paint has the highest amount of $TiO_2$ whereas 4-Base paint has the lowest amount of $TiO_2$. Other dry film properties for substantially similar inventive aqueous coating compositions and comparative premium, conventional-VOC aqueous paints are described in the priority documents, which have been previously incorporated by reference in their entireties. Similarly, as shown in Table 16 below, dry film properties were studied for the inventive and commercial zero-VOC aqueous paints having a flat, eggshell, and semi-gloss finish but only at a 1-Base level.

As further shown in Table 15, the dry film properties examined were odor, flow leveling, dry hide, water sensitivity, water staining, scrub, block resistance, and wet adhesion. A person having ordinary skill in the art would readily understand the definition of each dry film property as well as methods to measure each dry film property. Moreover, these properties are discussed in commonly owned patent application Ser. Nos. 11/470,817 and 12/042,841, which are incorporated herein by reference in their entireties.

In Table 15 below, the symbol "+" means that the inventive aqueous paint has a better dry film property than the comparative aqueous paint. In this test, the comparative paints are a premium paint line. The symbol "++" means that the inventive aqueous paint has a much better dry film property than the comparative aqueous paint. The symbol "=" means that the inventive aqueous paint has a dry film property equal to the comparative aqueous paint. The symbol "-" means that the inventive aqueous paint has a dry film property less desirable than the comparative aqueous paint. The symbol "--" means that the inventive aqueous paint has a dry film property significantly less desirable than the comparative aqueous paint. They symbols "=/+" or "=/-" mean that the inventive aqueous paint has a dry film that is slightly better or slightly less desirable, within the experimental margin of error, than the comparative aqueous paint.

TABLE 15

DRY FILM PROPERTIES: INVENTIVE PAINT VS. PREMIUM CONVENTIONAL-VOC PAINT

| | Dry Film Property | | | | | | |
|---|---|---|---|---|---|---|---|
| | Odor | Flow Leveling | Dry Hide | Water Staining | Scrub | Block Resist | Wet Adhesion |
| Flat | | | | | | | |
| 1-Base | ++ | + | = | = | =/+ | n/a | = |
| 2-Base | ++ | + | = | = | =/+ | n/a | = |
| 3-Base | ++ | + | = | = | = | n/a | = |
| 4-Base | ++ | + | = | = | = | n/a | = |
| Eggshell | | | | | | | |
| 1-Base | ++ | + | = | = | = | = | = |
| 2-Base | ++ | + | = | = | = | = | = |
| 3-Base | ++ | + | = | = | = | = | = |
| 4-Base | ++ | + | = | = | = | = | = |
| Semi-gloss | | | | | | | |
| 1-Base | + | + | = | - | =/- | =/+ | = |
| 2-Base | + | + | = | + | =/- | =/- | = |
| 3-Base | + | + | = | + | =/- | =/- | = |
| 4-Base | + | + | = | + | = | =/- | = |

The data presented in Table 15 indicate that the inventive zero-VOC aqueous paint, with de minimis volatile emissions, exhibits several dry film properties, for at least one finish, that are better than or equal to a conventional paint, including odor, flow leveling, dry hide, water sensitivity, water staining, scrubability, block resistance, and wet adhesion. More specifically, the odor for an inventive aqueous coating composition is much better (for flat and eggshell finishes) or better (for semi-gloss finish) than a conventional aqueous coating composition. The flow leveling of the inventive aqueous coating composition is better than (for flat, eggshell, and semi-gloss finishes) than a conventional aqueous coating composition. The dry hide of the inventive aqueous coating composition is equal to (for flat, eggshell, and semi-gloss finishes) a conventional aqueous coating composition. The water sensitivity of the inventive aqueous coating composition is generally better than (for semi-gloss finish) a conventional aqueous coating composition. The water staining of the inventive aqueous coating composition is generally better than (for semi-gloss finish except 1-base) or equal to (for flat or eggshell finish) a conventional aqueous coating composition. The block resistance of the inventive aqueous coating composition is general equal to (for eggshell and semi-gloss finishes) a conventional aqueous coating composition. The wet adhesion of the inventive aqueous coating composition is equal to (for flat, eggshell, and semi-gloss finishes) a conventional aqueous coating composition.

Table 16 below presents a synopsis of dry film properties that were studied for the inventive and commercial zero-VOC aqueous paints having a flat, eggshell, and semi-gloss finish at a 1-Base level. Table 16 again indicates that advantage of the inventive paint.

TABLE 16

DRY FILM PROPERTIES: INVENTIVE PAINT VS. COMMERCIAL ZERO-VOC PAINT

| | Odor | Flow Leveling | Dry Hide | Water Sensitivity | Water Staining | Scrub | Block Resist | Wet Adhesion |
|---|---|---|---|---|---|---|---|---|
| Flat | | | | | | | | |
| 1-Base | + | + | =/+ | = | = | + | n/a | = |
| Eggshell | | | | | | | | |
| 1-Base | + | + | = | = | = | ++ | = | = |
| Semi-gloss | | | | | | | | |
| 1-Base | + | + | + | = | = | + | + | = |

The data presented in Tables 15 and 16 indicate that the inventive zero-VOC aqueous paint, with de minimis volatile emissions, generally exhibits dry film properties that are better than or equal to a conventional paint. As noted above, a New York Times article has reported that consumers desire an environmentally sound paint with good performance. Example 8 above demonstrates that the inventive zero-VOC aqueous paint, with de minimis volatile emissions, can have dry film properties that are better than or equal to a premium conventional-VOC paint. Similarly, Example 9 below demonstrates that the inventive aqueous paint exhibits superior performance with respect to contrast ratio and hiding power.

Example 9

Contrast Ratio and Hiding Power

Example 9 illustrates that an inventive zero-VOC aqueous paint, with de minimis volatile emissions, comprising a latex polymer dispersion with substantially no residual compounds, i.e., a treated latex, with either a flat (Example 9A) or eggshell (Example 9B) finish exhibits a superior contrast ratio and hiding power when compared to three conventional, commercially available zero-VOC paints with flat and eggshell finishes (Examples 9C-9H). Moreover, the inventive zero-VOC aqueous paint was compared to three conventional, commercially available low-VOC and conventional VOC paints with flat and eggshell finishes (Examples 9I-9N).

Using a 2-mil drawdown bar, for each Example 9A-9N, a drawdown was applied onto a black and white Leneta drawdown card (Form 18B). A drawdown is the application of paint evenly to a card such as Leneta drawdown cards. Form 18B is a black and white card comprising four areas: two sealed white areas, one unsealed white area and one sealed black area Form 18B is a penopac chart, which measures opacity and penetration. Leneta cards are known in the art. In all the Examples discussed herein Form 18B is used as the substrate. The drawdown was dried overnight and the contrast ratio (C/R) of the dried film was measured with a spectrophotometer. C/R is measured in accordance with ASTM D2085-88 "Standard Test Method for Hiding Power of Paints by Reflectometry." When two coats with the same C/R are applied, a C/R of at least 95% of each coat is considered acceptable. The overall C/R of at least 99%, and more preferably 99.5%, is considered acceptable for two or more coats of dry film. The contrast ratio and hiding power values for Examples 9A-9N tabulated below in Tables 17 and 18.

TABLE 17

Contrast Ratio for Inventive Paint versus Comparative Zero-VOC Paints

| Property | Inventive Paint Flat (Example 10A) | Inventive Paint Eggshell (Example 10B) | Comparative Zero-VOC Paint 1 Flat (Example 10C) | Comparative Zero-VOC Paint 1 Eggshell (Example 10D) | Comparative Zero-VOC Paint 2 Flat (Example 10E) | Comparative Zero-VOC Paint 2 Eggshell (Example 10F) | Comparative Zero-VOC Paint 3 Flat (Example 10G) | Comparative Zero-VOC Paint 3 Eggshell (Example 10H) |
|---|---|---|---|---|---|---|---|---|
| Contrast Ratio 2 mil | .9976 | .999 | .9622 | .9759 | .9625 | .9527 | .9544 | .9443 |
| Hide (1 coat) | 99.47% | 98.85% | 97.34% | 98.29% | 96.37% | 92.79% | 94.86% | 92.55% |
| Hide (2 coat) | 100.01% | 99.86% | 99.81% | 99.81% | 99.41% | 98.52% | 97.60% | 97.64% |

TABLE 18

Contrast Ratio for Inventive Paint versus Comparative Paints

| Property | Inventive Paint | | Comparative Low-VOC Paint 4 (VOC = 37 g/L) | | Comparative Paint 5 (VOC = 100 g/L) | | Comparative Paint 6 (VOC = 100 g/L) | |
|---|---|---|---|---|---|---|---|---|
| | Flat (Example 10A) | Eggshell (Example 10B) | Flat (Example 10I) | Eggshell (Example 10J) | Flat (Example 10K) | Eggshell (Example 10L) | Flat (Example 10M) | Eggshell (Example 10N) |
| Contrast Ratio 2 mil | .9976 | .999 | .9983 | .9995 | .9581 | .9683 | .9886 | .979 |
| Hide (1 coat) | 99.47% | 98.85% | 99.89% | 99.95% | 92.79% | 95.91% | 98.92% | 97.17% |
| Hide (2 coat) | 100.01% | 99.86% | 100.03% | 100.05% | 99.38% | 99.41% | 100.15% | 99.76% |

The data presented in Tables 17 and 18 indicate that the inventive zero-VOC paint of Examples 9A and 9B, with flat or eggshell finishes respectively, exhibit higher contrast ratios than any conventional zero-VOC paints, having flat or eggshell finishes (Examples 9C-9H). Similarly, the hiding power, after application of either one or two coats, for Examples 9A and 9B is also higher than Examples 9C-9H. Likewise, Examples 9A and 9B exhibit superior contrast ratio and hiding power values in comparison to conventional paints with VOC=100 g/L (Examples 9K-9N). Only comparative low-VOC (37 g/L) paint 4 has slightly better contrast ratio and hiding power values.

The inventors of the present invention have determined that a preferred method to prepare the inventive low odor/low emission paints is to control all or substantially all the possible contaminants and their sources. In addition to using paint components or precursors that have low to zero-VOC, the preferred methodology includes manufacturing the low odor/low emission paints in a dedicated facility that makes no other paints to minimize contamination. The dedicated facility would have dedicated pipes, grinding tanks, mixing tanks and packaging facility.

All the pipes, nozzles and tanks should be pressure washed after every batch, since bacteria and mildew can grow in residual paints and paint precursors. The pipes, nozzles, tanks and other pieces of equipment that come into contact with the paints or paint precursors are preferably made from materials that are non-reactive and do not allow paints or paint precursors to permeate or absorbed into the materials. A preferred material is stainless steel.

Even for materials or equipment that do not contact the paints or paint precursors, care should be exercised so that these materials and equipment do not contain volatile substances. It is preferred that these materials are inspected to ensure that they contain no volatile component, since VOCs are volatile by nature they can permeate barriers to contaminate the paints or paint precursors. Cleaning chemicals that are used to sanitize the dedicated equipment should also be screened for VOCs.

In another example, pipes, grinding tanks or mixing tanks should be free of residual water between batches and preferably overnight. Biomass and more particularly bacteria, spores or mildew can grow in standing water and can spoil the paints. Bacteria can also produce hydrogen sulfide which produces a highly malodorous odor.

The paints produced in each batch should be tested for odor and/or emissions using the test methods discussed above. The ingredients used to make the paints, e.g., latex, water, tinting compositions, additives, also should be tested for VOC, odor and/or emission individually, so that if contamination is detected the source can be readily identified.

It is believed that this inventive method of production provides the inventive paint significantly lower volatile emissions and lower odor than the conventional low-VOC, zero-VOC, low odor or "green" paints discussed above. This inventive methodology resolved a long-felt need in the paint industry.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An aqueous coating composition comprising:

a treated acrylic latex, wherein the acrylic latex is treated to remove unreacted monomers such that the treated acrylic latex contains less than about 50 ppm of unreacted monomers;

one or more pigments selected from the group consisting of opacifying pigments, color pigments, and extender pigments; and optionally one or more additives selected from the group consisting of coalescence agents, pH adjustors, surfactants, defoamers, dispersants, rheology modifiers, biocides, and preservatives, wherein the aqueous coating composition has (i) a total detected volatile emissions value of less than about 250 ppm as measured according to headspace gas chromatography/mass spectrometry at about 70° C.; and (ii) a Comparative Odor Intensity Index value of less than about 2.0, wherein the aqueous coating composition has a pH of about 6 to about 10.

2. An aqueous coating composition comprising:
a treated acrylic latex, wherein the acrylic latex is treated to remove unreacted monomers such that the treated acrylic latex contains less than about 50 ppm of unreacted monomers;
one or more pigments selected from the group consisting of opacifying pigments, color pigments, and extender pigments; and
optionally one or more additives selected from the group consisting of coalescence agents, pH adjustors, surfactants, defoamers, dispersants, rheology modifiers, biocides, and preservatives,
wherein the aqueous coating composition has
  (i) a total detected volatile emissions value of less than about 250 ppm as measured according to headspace gas chromatography/mass spectrometry at about 120° C.; and
  (ii) a Comparative Odor Intensity Index value of less than about 2.0,
wherein the aqueous coating composition has a pH of about 6 to about 10.

3. An aqueous coating composition comprising:
a treated acrylic latex, wherein the acrylic latex is treated to remove unreacted monomers such that the treated acrylic latex contains less than about 50 ppm of unreacted monomers;
one or more pigments selected from the group consisting of opacifying pigments, color pigments, and extender pigments; and
optionally one or more additives selected from the group consisting of coalescence agents, pH adjustors, surfactants, defoamers, dispersants, rheology modifiers, biocides, and preservatives,
wherein the aqueous composition is a tinted composition; and
wherein the aqueous coating composition has
  (i) a volatile emission factor value of less than about 500 µg/m$^2$·hr, as measured according to ASTM D-5116 after a four hour period, and
  (ii) a Comparative Odor Intensity Index value of less than about 2.0,
wherein the aqueous coating composition has a pH of about 6 to about 10.

4. An aqueous coating composition comprising:
a treated acrylic latex, wherein the acrylic latex is treated to remove unreacted monomers such that the treated acrylic latex contains less than about 50 ppm of unreacted monomers;
one or more pigments selected from the group consisting of opacifying pigments and extender pigments; and
optionally one or more additives selected from the group consisting of coalescence agents, pH adjustors, surfactants, defoamers, dispersants, rheology modifiers, biocides, and preservatives,
wherein the aqueous coating composition has
  (i) a volatile emission factor value of less than about 50 µg/m$^2$·hr, as measured according to ASTM D-5116 after a twenty-four hour period, and
  (ii) a Comparative Odor Intensity Index value of less than about 2.0,
wherein the aqueous coating composition has a pH of about 6 to about 10.

5. An aqueous coating composition comprising:
a treated acrylic latex, wherein the acrylic latex is treated to remove unreacted monomers such that the treated acrylic latex contains less than about 50 ppm of unreacted monomers;
one or more pigments selected from the group consisting of opacifying pigments, color pigments, and extender pigments; and
a coalescence agent comprises an organic compound with a boiling point above 220° C., wherein the coalescence agent makes up about 0.01% to about 10% by weight of the composition;
optionally one or more additives selected from the group consisting of pH adjustors, surfactants, defoamers, dispersants, rheology modifiers, biocides, and preservatives,
wherein the aqueous composition is a tinted composition; and
wherein the aqueous coating composition has
  (i) a volatile emission factor value of less than about 500 µg/m$^2$·hr, as measured according to ASTM D-5116 after a four hour period, and
  (ii) a Comparative Odor Intensity Index value of less than about 2.0, wherein the aqueous coating composition has a pH of about 6 to about 10.

6. The aqueous coating composition of claim 1 comprising a volatile organic compound content of less than about 3.0 g/L.

7. The aqueous coating composition of claim 1, wherein the Comparative Odor Intensity Index value is less than about 1.5.

8. The aqueous coating composition of claim 1, wherein the composition exhibits a contrast ratio of at least about 0.990.

9. The aqueous coating composition of claim 1, wherein the total detected volatile emissions value is less than about 150 ppm.

10. The aqueous coating composition of claim 1, wherein the total detected volatile emissions value is less than about 50 ppm.

11. The aqueous coating composition of claim 3, wherein the volatile emission factor has a value of less than about 450 µg/m$^2$·hr.

12. The aqueous coating composition of claim 3, the volatile emission factor has a value of less than about 400 µg/m$^2$·hr.

13. The aqueous coating composition of claim 3, wherein the volatile emission factor has a value of less than about 375 µg/m$^2$·hr.

14. The aqueous coating composition of claim 4, wherein the volatile emission factor has a value of less than about 40 µg/m$^2$·hr.

15. The aqueous coating composition of claim 4, wherein the volatile emission factor has a value of less than about 30 µg/m$^2$·hr.

16. The aqueous coating composition of claim 5, wherein the latex comprises untreated latex.

17. The aqueous coating composition of claim 5, wherein the coalescence agent comprises $C_{16}H_{30}O_4$, a non-phthalate organic compound, propylene glycol monoester of unsaturated fatty acids, or a derivative of vegetable oils.

18. The aqueous coating composition of claim 5, wherein the coalescence agent forms a part of the coating when dried.

19. The aqueous coating composition of claim 5, wherein the coalescence agent has a boiling point above about 250° C.

20. The aqueous coating composition of claim 5, wherein the coalescence agent has a boiling point above about 270° C.

21. The aqueous coating composition of claim 5 further comprises a carboxylated polyelectrolyte salt, a tripolyphosphate salt or a tetrapotassium pyrophosphate as the dispersant.

22. The aqueous coating composition of claim 21, wherein the dispersant comprises potassium tripolyphosphate.

23. The aqueous coating composition of claim 5 further comprises zinc omadine as a mildewcide.

24. The aqueous coating composition of claim 1 further comprising an untreated latex.

25. The aqueous coating composition of claim 24, wherein the treated latex comprises about 80% of a blend and the untreated latex comprises about 20% of the blend.

26. The aqueous coating composition of claim 1, wherein the treated latex comprises less than about 25 ppm of unreacted monomers.

27. The aqueous coating composition of claim 1, wherein the treated latex comprises less than about 10 ppm of unreacted monomers.

28. A method for manufacturing an aqueous coating composition comprising the steps of
   i. providing an acrylic latex having less than about 50 ppm unreacted monomers;
   ii. providing at least one additive selected from the group consisting of pH adjustors, surfactants, defoamers, dispersants, rheology modifiers, biocides, preservatives, pigments and tinting compounds;
   iii. combining the precursors of steps (i)-(ii) using dedicated equipment to manufacture the aqueous coating composition;
   iv. minimizing the formation of biomass in the dedicated equipment that contacts the precursors or the aqueous coating composition;
   v. minimizing the volatile content of the materials used in or related to the manufacture of the aqueous coating composition, wherein said materials do not contact the precursors or the aqueous coating composition;
   vi. maintaining the aqueous coating composition has
      (a.) a total detected volatile emissions value of less than about 250 ppm as measured according to headspace gas chromatography/mass spectrometry at about 70° C.; and
      (b.) a Comparative Odor Intensity Index value of less than about 2.0, wherein the dedicated equipment manufactures no paint other than said aqueous coating composition.

29. The aqueous coating composition of claim 1, wherein the acrylic latex is treated after polymerization to remove residual compounds at least by stripping.

* * * * *